(12) United States Patent
Abe

(10) Patent No.: US 8,773,771 B2
(45) Date of Patent: Jul. 8, 2014

(54) IMAGE PICKUP OPTICAL SYSTEM AND IMAGE PICKUP APPARATUS USING THE SAME

(75) Inventor: Kenichiro Abe, Tachikawa (JP)

(73) Assignee: Olympus Corporation, Tokyo (JP)

( * ) Notice: Subject to any disclaimer, the term of this patent is extended or adjusted under 35 U.S.C. 154(b) by 375 days.

(21) Appl. No.: 13/066,032

(22) Filed: Apr. 4, 2011

(65) Prior Publication Data

US 2011/0254992 A1    Oct. 20, 2011

(30) Foreign Application Priority Data

Apr. 15, 2010   (JP) ................................ 2010-094000

(51) Int. Cl.
*G02B 13/18*    (2006.01)
*G02B 9/34*    (2006.01)

(52) U.S. Cl.
USPC .......................................... 359/715; 359/773

(58) Field of Classification Search
USPC ................................................. 359/715, 773
See application file for complete search history.

(56) References Cited

U.S. PATENT DOCUMENTS

| | | | |
|---|---|---|---|
| 7,289,278 B1 | 10/2007 | Jo et al. | |
| 7,466,497 B2 | 12/2008 | Park et al. | |
| 7,755,854 B2 | 7/2010 | Sano | |
| 7,920,340 B2 * | 4/2011 | Tang | 359/773 |
| 7,965,454 B2 | 6/2011 | Tanaka et al. | |
| 8,102,608 B2 * | 1/2012 | Taniyama | 359/773 |
| 8,116,014 B2 | 2/2012 | Taniyama | |

FOREIGN PATENT DOCUMENTS

| | | |
|---|---|---|
| JP | 2007-017984 | 1/2007 |
| JP | 2007-219520 | 8/2007 |
| JP | 2008-242180 | 10/2008 |
| JP | 2008-268946 | 11/2008 |
| JP | 2009-020182 | 1/2009 |
| JP | 2009-069193 | 4/2009 |
| JP | 4317933 | 6/2009 |
| JP | 2009-169005 | 7/2009 |
| JP | 2010-079296 | 4/2010 |
| JP | 2010-102162 | 5/2010 |

* cited by examiner

*Primary Examiner* — Scott J Sugarman
(74) *Attorney, Agent, or Firm* — Kenyon & Kenyon LLP

(57) ABSTRACT

An image pickup optical system having four lenses includes in order from an object side, a first lens having a biconvex shape, and a positive refractive power, a second lens having a biconcave shape, and a negative refractive power, a third lens having a meniscus shape with a concave surface thereof directed toward the object side, and a positive refractive power, and a fourth lens having a biconcave shape, and a negative refractive power, and a diaphragm is disposed nearest to the object side, and the surface on the object side of the fourth lens does not have a point of inflection as well as the optical system satisfying the recited numerical conditions.

8 Claims, 22 Drawing Sheets

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2010-94000 filed on Apr. 15, 2010; the entire contents of which are incorporated herein by reference.

BACKGROUND OF THE INVENTION

1. Field of the Invention

The present invention relates to an image pickup optical system and an image pickup apparatus using the same.

2. Description of the Related Art

In recent years, with a thinning of equipments such as a mobile telephone, a portable terminal, and a personal computer, a camera module in which, a length of an optical system in an optical axial direction is thinned to the minimum has been sought. In order to fulfill the requirement, a large number of optical systems with a single focal length, which include about two to three aspheric lenses, have been proposed.

Moreover, in recent years, with the technological development of an image pickup element and the increasing needs of the market, a camera module which is small as well as has a large number of pixels, wide angle, and low-cost, has been sought. As an optical system in which, shortening of an overall length of the optical system is facilitated while improving an image forming performance, an optical system proposed in Japanese Patent No. 4317933 and optical systems proposed in Japanese Patent Application Laid-open Publication Nos. 2008-268946 and 2009-169005, in which, the number of lenses is let to be four, are available.

These optical systems use four lenses and correct a chromatic aberration favorably for improving a resolution for a large number of pixels while having a small size.

SUMMARY OF THE INVENTION

An image pickup optical system according to the present invention having four lenses, includes in order from an object side a first lens having a biconvex shape, and a positive refractive power, a second lens having a biconcave shape, and a negative refractive power, a third lens having a meniscus shape with a concave surface thereof directed toward the object side, and a positive refractive power, and a fourth lens having a biconcave shape, and a negative refractive power, and a diaphragm is disposed nearest to the object side, and the image pickup optical system satisfies the following conditional expressions $$-0.9 < f4/f < 0 \quad (1)$$

$$-0.04 < (r8+r9)/(r8-r9) < 1.3 \quad (2)$$

where, f4 denotes a focal length at a near-axis of the fourth lens, f denotes a focal length of the overall image pickup optical system, r8 denotes a radius of curvature of a surface on the object side of the fourth lens, and r9 denotes a radius of curvature of a surface on an image side of the fourth lens.

DETAILED DESCRIPTION OF THE PREFERRED EMBODIMENTS

Figure 1:
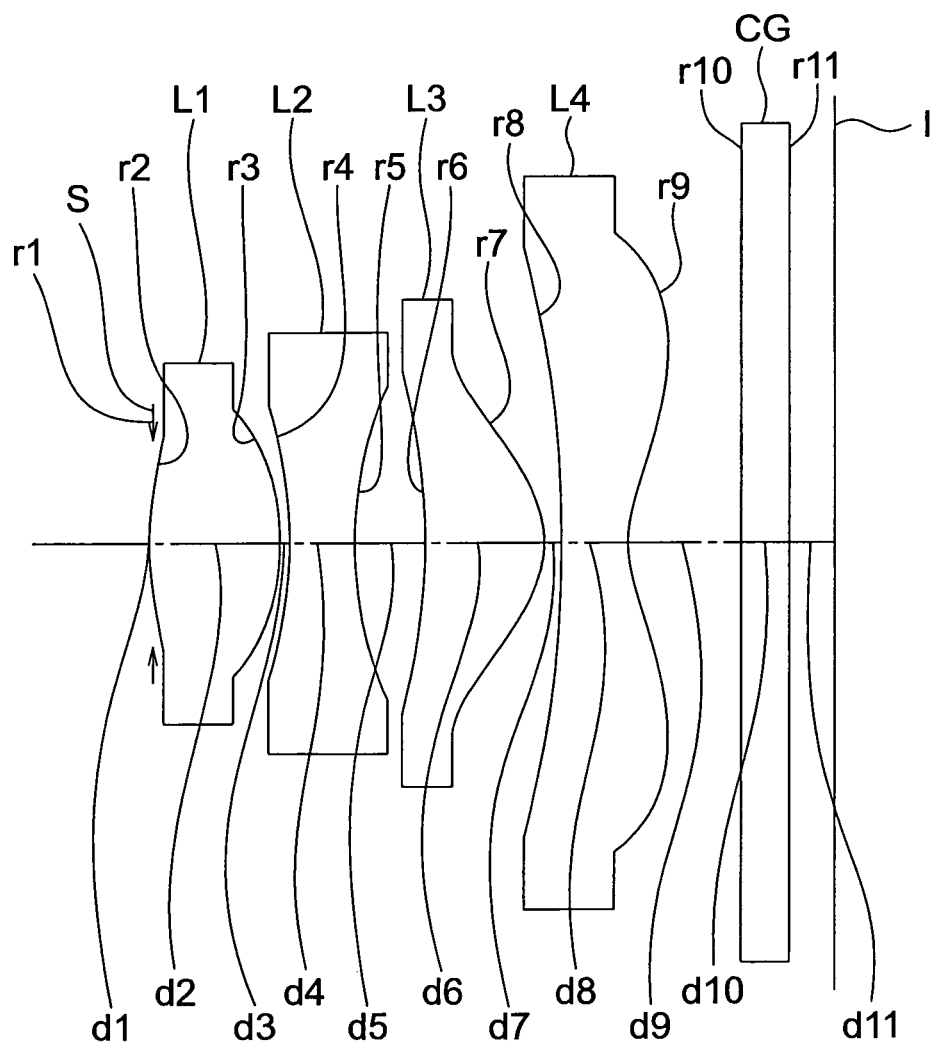
FIG. 1 is a cross-sectional view along an optical axis showing an optical arrangement at the time of infinite object point focusing of an image pickup optical system according to a first embodiment of the present invention.

First of all, prior to description of embodiments, an action and an effect of an image pickup optical system according to the present invention will be described below.

An image pickup optical system having four lenses, includes in order from an object side a first lens having a biconvex shape, and a positive refractive power, a second lens having a biconcave shape, and negative refractive power, a third lens having a meniscus shape with a concave surface thereof directed toward the object side, and a positive refractive power, and a fourth lens having a biconcave shape, and a negative refractive power, and a diaphragm is disposed nearest to the object side, and the image pickup optical system satisfies the following conditional expressions $$-0.9 < f4/f < 0 \quad (1)$$

$$-0.04 < (r8+r9)/(r8-r9) < 1.3 \quad (2)$$

where, f4 denotes a focal length at a near-axis of the fourth lens, f denotes a focal length of the overall image pickup optical system, r8 denotes a radius of curvature of a surface on the object side of the fourth lens, and r9 denotes a radius of curvature of a surface on an image side of the fourth lens.

By disposing a position of a principal point on the object side of the image pickup optical system, since it is possible to make an overall length of the image pickup optical system sufficiently small with respect to a focal length, and shortening of the overall length can be realized.

Moreover, by disposing the diaphragm nearest to the object side, it is possible to keep an exit pupil away from an image plane. Accordingly, it is possible to make small an angle of light rays which are incident on a peripheral portion of an image pickup element. As a result, it becomes possible to avoid degradation of (decrease in) an oblique incident light in the peripheral area of the image pickup element.

Conditional expression (1) regulates a favorable condition for securing sufficient back focal length while shortening the overall length.

When an upper limit value in conditional expression (1) is surpassed, since the negative refractive power of the fourth lens becomes weak, and it becomes difficult to position the position of the principal point on the object side of the image pickup optical system. Therefore, shortening of the overall length of the image pickup optical system becomes difficult.

When a lower limit value in conditional expression (1) is surpassed, since the negative refractive power of the fourth lens becomes large, and it becomes difficult to secure the back focal length sufficiently when an angle of field of the image pickup optical system is widened.

Conditional expression (2) regulates a condition which is favorable for avoiding decrease in peripheral light amount and for widening an angle of field. Further, by suppressing an exit angle of light rays from a surface on the image side of the fourth lens, degradation of peripheral light amount could be avoided. Accordingly, conditional expression (2) regulates a condition which is favorable for suppressing an exit angle of light rays from a surface on the image side of the fourth lens and for widening an angle of field. Further, an avoidance of peripheral light amount includes a state where degradation of peripheral light amount could be reduced even when an F value (F-number) of the lens is made brighter.

When a lower limit value in conditional expression (2) is surpassed, a curvature on the image side of the fourth lens becoming excessively large. In this case, an exit angle of off-axis light beam from the surface on the image side of the fourth lens becomes steep. As a result, since an angle of light rays which are incident on a peripheral portion of the image pickup element becomes large, and it becomes difficult to avoid degradation of the peripheral light amount. Furthermore, when a lower limit value in conditional expression (2) is surpassed, correction of a coma aberration becomes difficult.

When an upper limit value in conditional expression (2) is surpassed, a principal point of the fourth lens is positioned toward the object side, since a negative curvature on the object side of the fourth lens becoming excessively large. Therefore, widening of the angle of field and shortening of combined focal length of the overall image pickup optical system becomes difficult.

Moreover, it is preferable that the image pickup optical system of the present invention satisfies the following conditional expression (1') instead of conditional expression (1).

$$-0.72 < f4/f < -0.22 \quad (1')$$

Furthermore, it is more preferable that the image pickup optical system of the present invention satisfies the following conditional expression (1″) instead of conditional expression (1).

$$-0.62<f4/f<-0.31 \quad (1″)$$

Moreover, it is preferable that the image pickup optical system of the present invention satisfies the following conditional expression (2′) instead of conditional expression (2).

$$0.38<(r8+r9)/(r8-r9)<1.1 \quad (2′)$$

Furthermore, it is more preferable that the image pickup optical system of the present invention satisfies the following conditional expression (2″) instead of conditional expression (2).

$$0.55<(r8+r9)/(r8-r9)<0.9 \quad (2″)$$

In the image pickup optical system of the present invention, it is desirable that the surface on the object side of the fourth lens does not have a point of inflection. By suppressing a change in curvature of a lens surface at an off-axis, it is possible to suppress a variation in a curvature of field due to an image pickup distance, and moreover, it is possible to suppress degradation of performance due to a manufacturing error.

In the image pickup optical system of the present invention, it is desirable that the surface on the object side of the fourth lens is a spherical surface. Accordingly, since it is possible to make small an angle of incidence of the off-axis light beam on the surface on the object side of the fourth lens, and to minimize an occurrence of the coma aberration. Moreover, by making the curvature constant from axial to peripheral area, it is possible to minimize degradation of performance due to a manufacturing error.

In the image pickup optical system of the present invention, it is desirable that a half angle of field ω is in the following range.

$$30°<ω<60° \quad (A)$$

It is desirable that the image pickup optical system of the present invention satisfies the following conditional expression.

$$0.08<(r2+r3)/(r2-r3)<0.42 \quad (3)$$

where, r2 denotes a radius of curvature of a surface on the object side of the first lens, and r3 denotes a radius of curvature of a surface on the image side of the first lens.

Conditional expression (3) regulates a preferable shape of the first lens.

When a lower limit value in conditional expression (3) is surpassed, the radius of curvature on the object side of the first lens becomes small. In this case, since an angle of incidence of light rays on the surface on the object side of the first lens becomes steep, correction of coma aberration becomes difficult. Particularly, when an attempt is made to maintain the half angle of field in the range in conditional expression (A), the correction of coma aberration becomes difficult.

When an upper limit value in conditional expression (3) is surpassed, the radius of curvature on the object side of the first lens becomes large, and conversely, curvature on the image side becomes strong. Therefore, it becomes difficult to position the principal point toward the object side in the overall image pickup optical system. As a result, shortening of the overall image pickup optical system becomes difficult.

It is preferable that the image pickup optical system of the present invention satisfies the following conditional expression (3′) instead of conditional expression (3).

$$0.11<(r2+r3)/(r2-r3)<0.31 \quad (3′)$$

Furthermore, it is more preferable that the image pickup optical system of the present invention satisfies the following conditional expression (3″) instead of conditional expression (3).

$$0.14<(r2+r3)/(r2-r3)<0.27 \quad (3″)$$

Moreover, in the image pickup optical system of the present invention, it is desirable that an Fno (F value) is in the following range.

$$2.0<Fno<2.8 \quad (B)$$

It is desirable that the image pickup optical system of the present invention satisfies the following conditional expression (C).

$$0.01<1/v2-1/v1<0.03 \quad (C)$$

where, v1 denotes Abbe's number (nd1−1)/(nF1−nC1) for the first lens, v2 denotes Abbe's number (nd2−1)/(nF2−nC2) for the second lens, where, nd1, nC1, nF1, and ng1 denote refractive indices for a d-line, a C-line, an F-line, and a g-line respectively of the first lens, and nd2, nC2, nF2, and ng2 denote refractive indices for the d-line, the C-line, the F-line, and the g-line respectively of the second lens.

Conditional expression (C) is a relational expression relating Abbe's number for the first lens and Abbe's number for the second lens. By satisfying conditional expression (C), it is possible to correct a chromatic aberration favorably.

Moreover, it is desirable that the image pickup optical system of the present invention satisfies the following conditional expression.

$$-0.03<(r4+r5)/(r4-r5)<0.55 \quad (4)$$

where, r4 denotes a radius of curvature of a surface on the object side of the second lens, and r5 denotes a radius of curvature of a surface on the image side of the second lens.

Conditional expression (4) regulates a shape of the second lens.

When a lower limit value in conditional expression (4) is surpassed, the radius of curvature on the image side of the second lens becomes large. In this case, it is not possible to make large an exit angle of light rays from the second lens when light rays are emerged from the second lens. As a result, it becomes difficult to achieve the shortening of the image pickup optical system and securing of the telecentricity simultaneously. Particularly, when an attempt is made to satisfy conditional expression (C) upon maintaining the half angle of field in the range of conditional expression (A), it becomes difficult to achieve the shortening of the image pickup optical system and securing of the telecentricity simultaneously.

When an upper limit value in conditional expression (4) is surpassed, the radius of curvature on the object side of the second lens becomes large. Therefore, correction of a spherical aberration which has occurred at the first lens becomes insufficient. Particularly, when an attempt is made to maintain the F value in the range of conditional expression (B), correction of the coma aberration becomes difficult.

It is preferable that the image pickup optical system of the present invention satisfies the following conditional expression (4') instead of conditional expression (4).

$$0.10 < (r4+r5)/(r4-r5) < 0.41 \quad (4')$$

Furthermore, it is more preferable that the image pickup optical system of the present invention satisfies the following conditional expression (4") instead of conditional expression (4).

$$0.16 < (r4+r5)/(r4-r5) < 0.36 \quad (4")$$

Moreover, it is desirable that the image pickup optical system of the present invention satisfies the following conditional expression.

$$0.97 < (r6+r7)/(r6-r7) < 1.52 \quad (5)$$

where, r6 denotes a radius of curvature of a surface on the object side of the third lens, and r7 denotes a radius of curvature of a surface on the image side of the third lens.

Conditional expression (5) regulates a condition which is favorable for suppressing an angle of incidence of light rays on the surface on the object side and the image side of the third lens, and corrects the coma aberration favorably, as well as, regulates a condition for realizing shortening the overall length of the image pickup optical system while maintaining the telecentricity of the image pickup optical system.

Further, by suppressing the angle of incidence of light rays on the surface on the object side and the image side of the third lens, the coma aberration could be corrected favorably.

Accordingly, conditional expression (5) regulates a condition which is favorable for the angle of incidence of light rays on the surface on the object side and the image side of the third lens and for realizing shortening the overall length of the image pickup optical system while maintaining the telecentricity of the image pickup optical system.

When an upper limit value in conditional expression (5) is surpassed, the negative curvature on the object side and the image side of the third lens becomes excessively small. In this case, when an off-axis light ray is incident on the surface on the object side and the image side of the third lens, since an angle of incidence of an off-axis light beam becomes steep, correction of the coma aberration becomes difficult.

When a lower limit value in conditional expression (5) is surpassed, since the negative curvature on the image side of the third lens becoming excessively large, when light beam is emerged from the third lens, an exit angle from the third lens becomes small. Therefore, it becomes difficult to achieve the shortening of the overall length of the image pickup optical system and securing of the telecentricity simultaneously.

It is preferable that the image pickup optical system of the present invention satisfies the following conditional expression (5') instead of conditional expression (5).

$$1.10 < (r6+r7)/(r6-r7) < 1.47 \quad (5')$$

It is more preferable that the image pickup optical system of the present invention satisfies the following conditional expression (5") instead of conditional expression (5).

$$1.34 < (r6+r7)/(r6-r7) < 1.40 \quad (5")$$

Moreover, in the image pickup optical system of the present invention, it is desirable that the first lens, the second lens, the third lens, and the fourth lens are formed of a resin.

By using a resin, it is possible to provide a low-cost image pickup optical system.

According to another preferable aspect of the present invention, an image pickup apparatus of the present invention includes an image pickup optical system which has been described above, and an electronic image pickup element having an image pickup surface, and the image pickup apparatus satisfies the following conditional expression.

$$15° < \alpha i < 30° \quad (6)$$

where,

α denotes an angle of incidence of a principal light ray on the image pickup surface, at the maximum image height.

In a case of using a CCD (charge coupled device) for a solid image pickup element, when off-axis light beam (off-axis chief ray) emerged from an optical system is incident on an image pickup surface making a large angle, brightness of image changes in a central portion and a peripheral portion of the image. Moreover, when the angle of incidence on the image pickup surface is small, the problem of change in brightness is solved but the overall length of the optical system becomes long. Therefore, it is desirable that the image pickup optical system satisfies conditional expression (6).

Moreover, according still another preferable aspect of the present invention, it is desirable that the image pickup apparatus includes an auto-focus mechanism which is integrated with the image pickup optical element.

By installing the auto-focus mechanism, it is possible to focus at any object distance.

Moreover, according to still another preferable aspect of the present invention, it is desirable that in the image pickup apparatus, the image pickup optical system and the electronic image pickup element are integrated.

By integrating the image pickup optical system and the electronic image pickup element, it is possible to convert an optical image captured by the image pickup optical system to an electric signal. Moreover, by selecting an electronic image pickup element which is capable of reducing a change (difference) in a brightness of an image in a central portion and a peripheral portion of the image by αi, it is possible to provide an image pickup apparatus having a small size and an improved performance.

Exemplary embodiments of an image pickup optical system and an image pickup apparatus according to the present invention will be described below in detail by referring to the accompanying diagrams. However, the present invention is not restricted to the embodiments described below.

To start with, an image pickup optical system according to a first embodiment of the present invention will be described below. FIG. 1 is a cross-sectional view along an optical axis showing an optical arrangement at the time of infinite object point focusing of the image pickup optical system according to the first embodiment.

Figure 2:
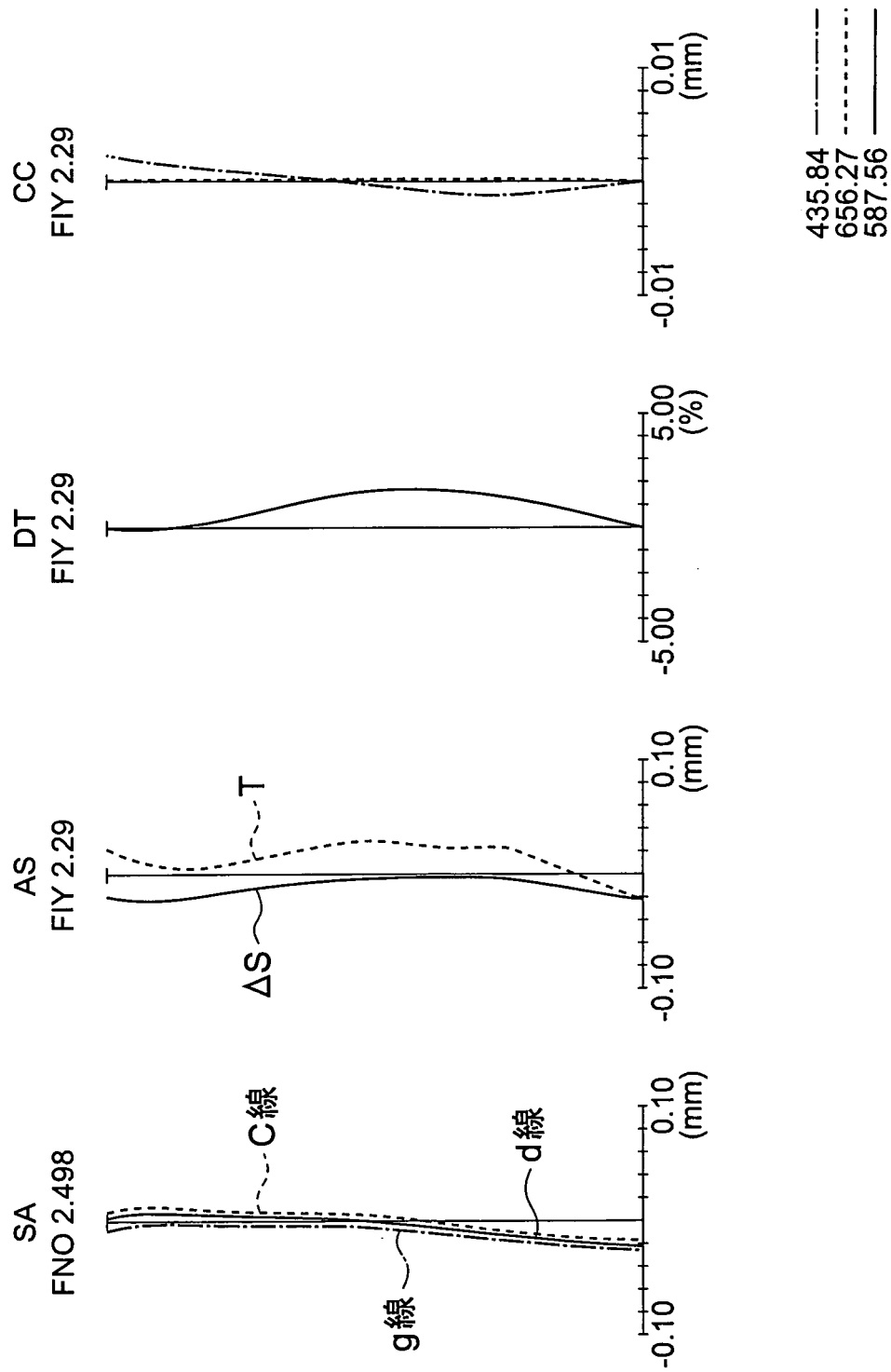
FIG. 2 is a diagram showing a spherical aberration (SA) an astigmatism (AS), a distortion (DT), and a chromatic aberration of magnification (CC) at the time of infinite object point focusing of the image pickup optical system according to the first embodiment.

FIG. 2 is a diagram showing a spherical aberration (SA), an astigmatism (AS), a distortion (DT), and a chromatic aberration of magnification (CC) at the time of infinite object point focusing of the image pickup optical system according to the first embodiment. Moreover, FIY denotes an image height. Symbols in aberration diagrams are same in the embodiments that will be described later.

The image pickup optical system of the first embodiment, as shown in FIG. 1, includes in order from an object side, an aperture stop S, a first lens L1 having a positive refractive power, a second lens L2 having a negative refractive power, a third lens L3 having a positive refractive power, and a fourth lens L4 having a negative refractive power. In all the embodiments that will be described below, in lens cross-sectional views, CG denotes a cover glass, and I denotes an image pickup surface of an electronic image pickup element.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 3:
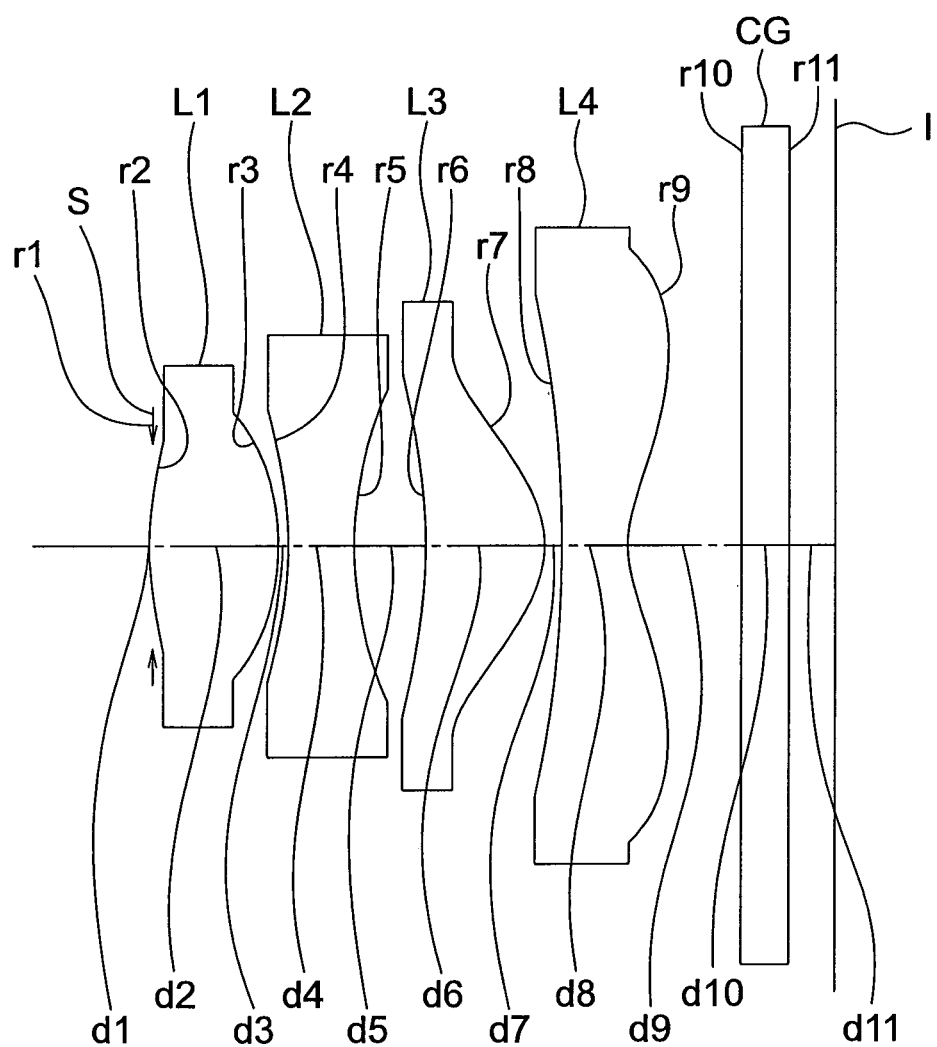
FIG. 3 is a cross-sectional view along an optical axis showing an optical arrangement at the time of infinite object point focusing of an image pickup optical system according to a second embodiment of the present invention.

Next, an image pickup optical system according to a second embodiment of the present invention will be described below. FIG. 3 is a cross-sectional view along an optical axis showing an optical arrangement at the time of infinite object point focusing of the image pickup optical system according to the second embodiment.

Figure 4:
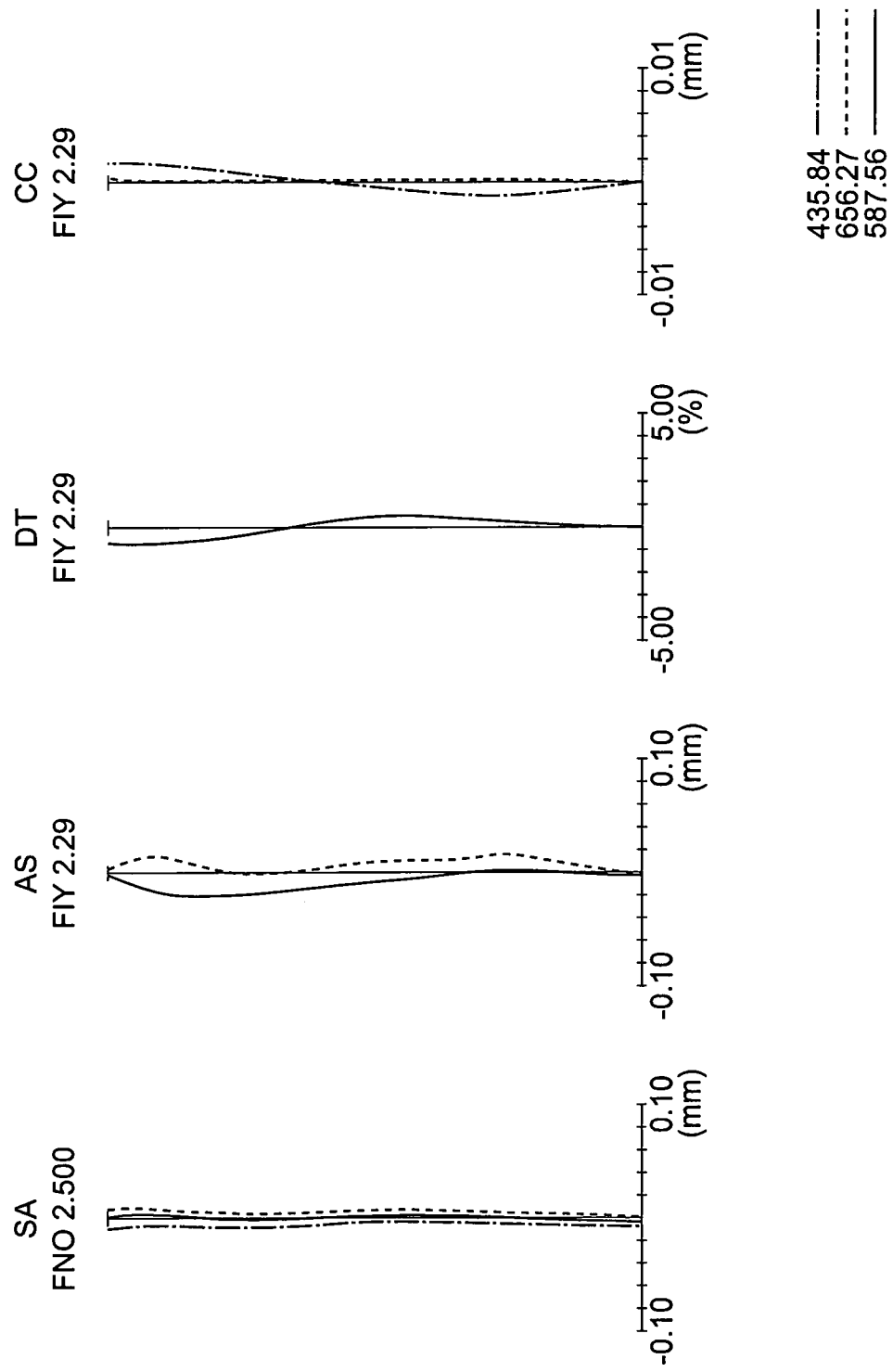
FIG. 4 is a diagram showing a spherical aberration (SA), an astigmatism (AS), a distortion (DT), and a chromatic aberration of magnification (CC) at the time of infinite object point focusing of the image pickup optical system according to the second embodiment.

FIG. 4 is a diagram showing a spherical aberration (SA), an astigmatism (AS), a distortion (DT), and a chromatic aberration of magnification (CC) at the time of infinite object point focusing of the image pickup optical system according to the second embodiment.

The image pickup optical system of the second embodiment, as shown in FIG. 3, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 5:
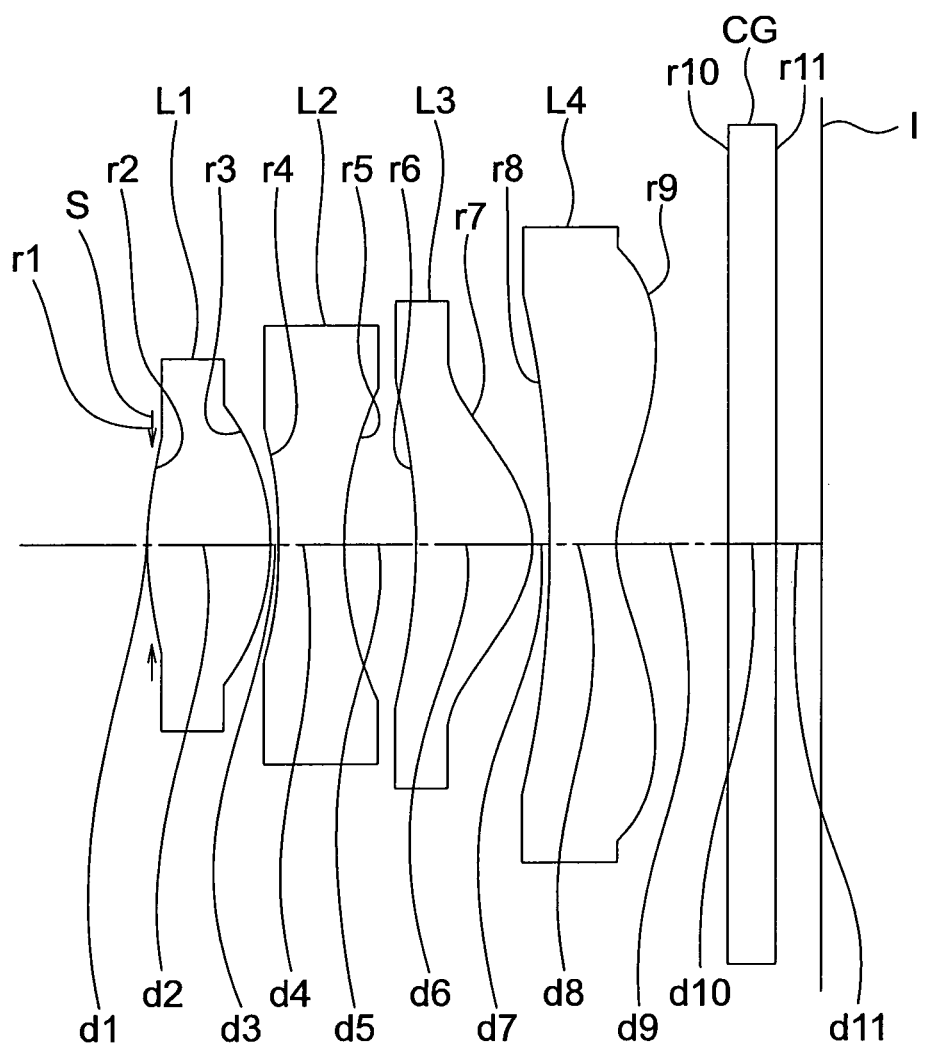
FIG. 5 is a cross-sectional view along an optical axis showing an optical arrangement at the time of infinite object point focusing of an image pickup optical system according to a third embodiment of the present invention.

Next, an image pickup optical system according to a third embodiment of the present invention will be described below. FIG. 5 is a cross-sectional view along an optical axis showing an optical arrangement at the time of infinite object point focusing of the image pickup optical system according to the third embodiment.

Figure 6:
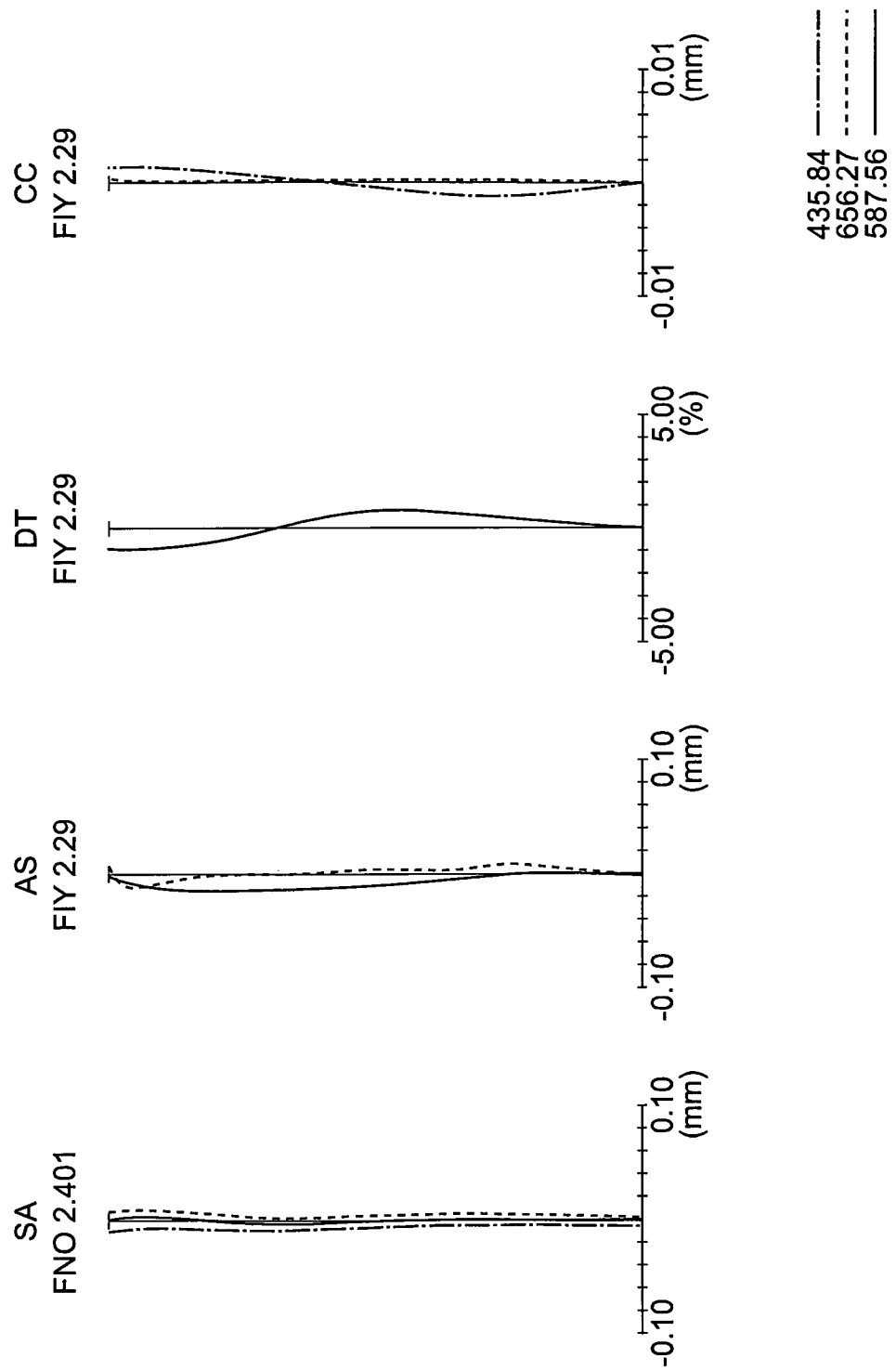
FIG. 6 is a diagram showing a spherical aberration (SA), an astigmatism (AS), a distortion (DT), and a chromatic aberration of magnification (CC) at the time of infinite object point focusing of the image pickup optical system according to the third embodiment.

FIG. 6 is a diagram showing a spherical aberration (SA), an astigmatism (AS), a distortion (DT), and a chromatic aberration of magnification (CC) at the time of infinite object point focusing of the image pickup optical system according to the third embodiment.

The image pickup optical system of the third embodiment, as shown in FIG. 5, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Next, an image pickup optical system according to a fourth embodiment of the present invention will be described below.

Figure 7:
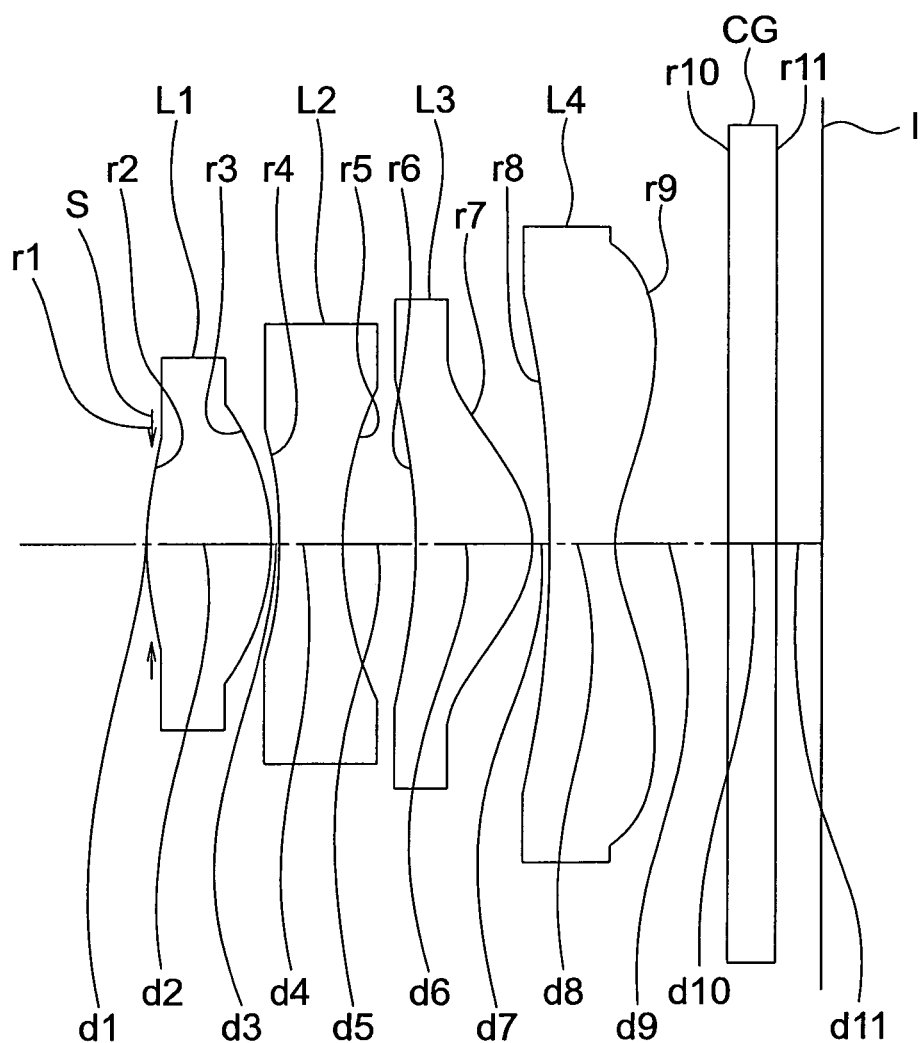
FIG. 7 is a cross-sectional view along an optical axis showing an optical arrangement at the time of infinite object point focusing of an image pickup optical system according to a fourth embodiment of the present invention.

FIG. 7 is a cross-sectional view along an optical axis showing an optical arrangement at the time of infinite object point focusing of the image pickup optical system according to the fourth embodiment.

Figure 8:
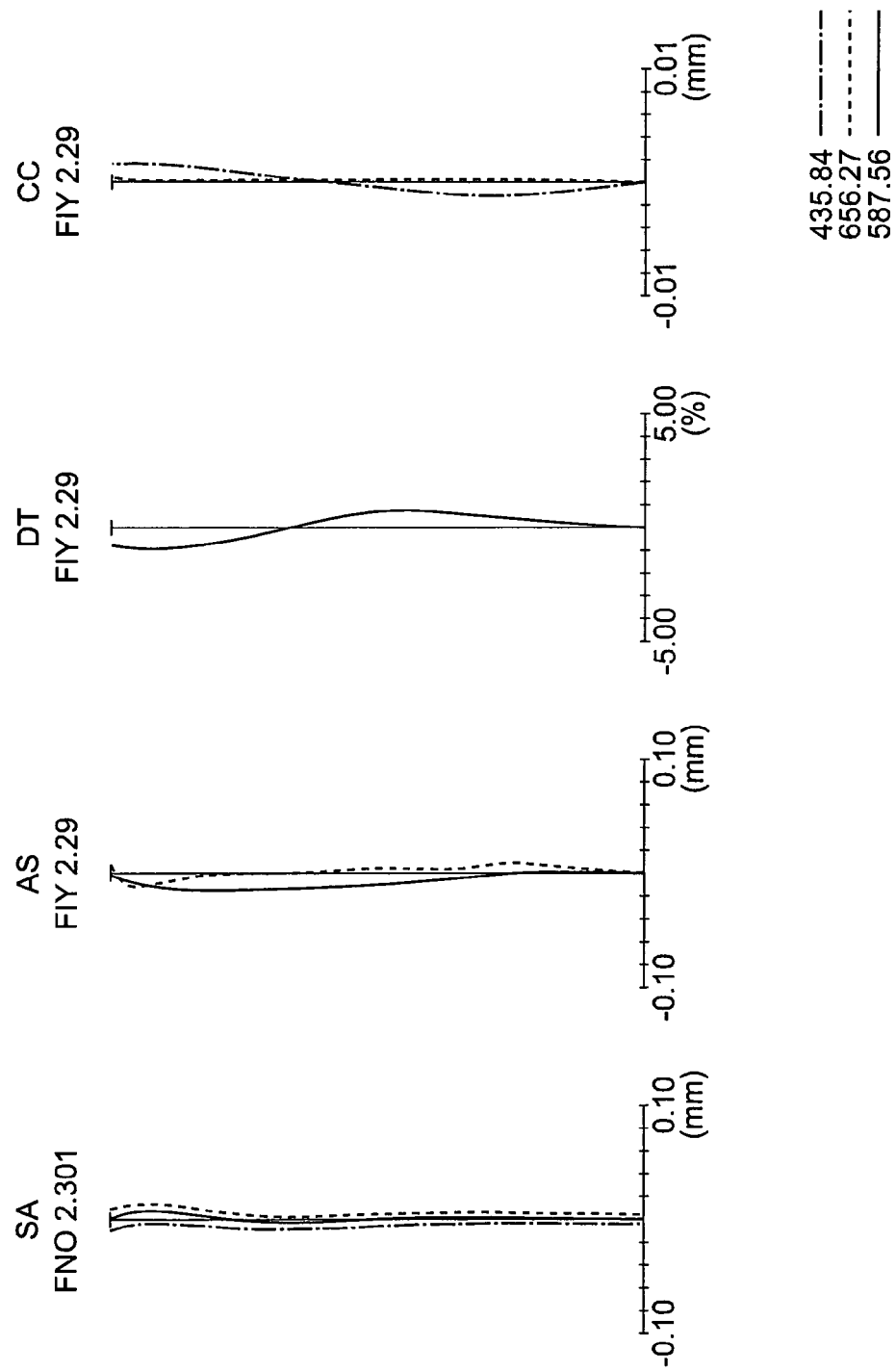
FIG. 8 is a diagram showing a spherical aberration (SA), an astigmatism (AS), a distortion (DT), and a chromatic aberration of magnification (CC) at the time of infinite object point focusing of the image pickup optical system according to the fourth embodiment.

FIG. 8 is a diagram showing a spherical aberration (SA), an astigmatism (AS), a distortion (DT), and a chromatic aberration of magnification (CC) at the time of infinite object point focusing of the image pickup optical system according to the fourth embodiment.

The image pickup optical system of the fourth embodiment, as shown in FIG. 7, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 9:
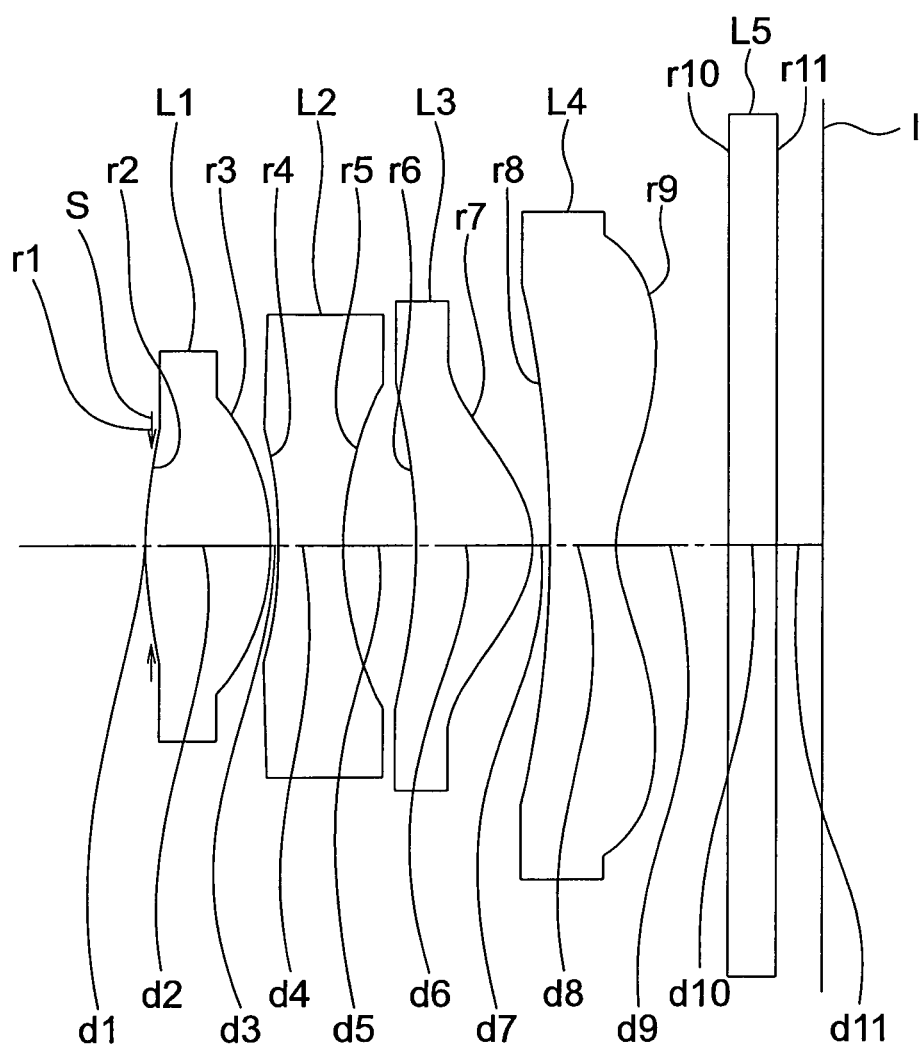
FIG. 9 is a cross-sectional view along an optical axis showing an optical arrangement at the time of infinite object point focusing of an image pickup optical system according to a fifth embodiment of the present invention.

Next, an image pickup optical system according to a fifth embodiment of the present invention will be described below. FIG. 9 is a cross-sectional view along an optical axis showing an optical arrangement at the time of infinite object point focusing of the image pickup optical system according to the fifth embodiment.

Figure 10:
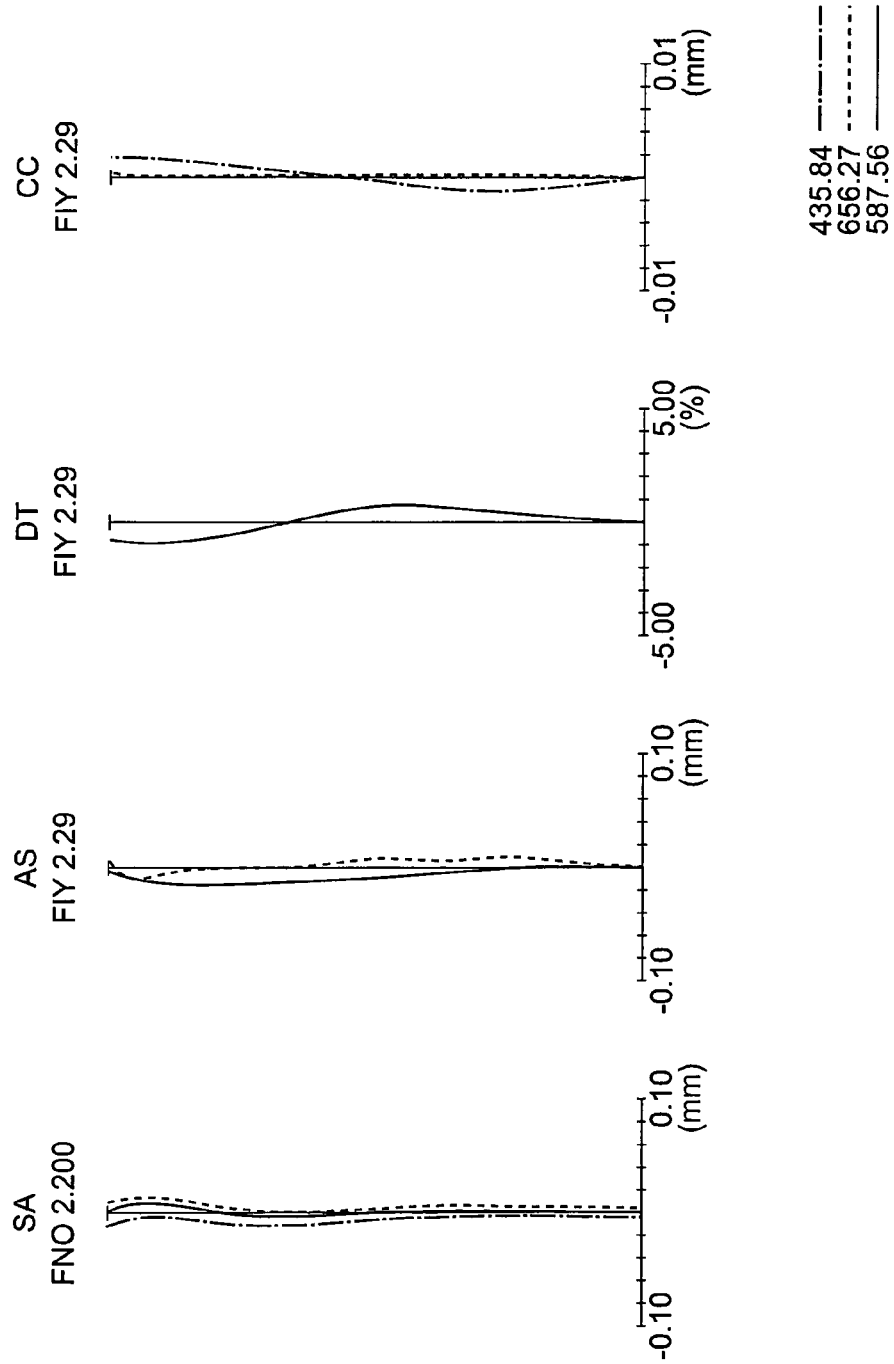
FIG. 10 is a diagram showing a spherical aberration (SA), an astigmatism (AS), a distortion (DT), and a chromatic aberration of magnification (CC) at the time of infinite object point focusing of the image pickup optical system according to the fifth embodiment.

FIG. 10 is a diagram showing a spherical aberration (SA), an astigmatism (AS), a distortion (DT), and a chromatic aberration of magnification (CC) at the time of infinite object point focusing of the image pickup optical system according to the fifth embodiment.

The image pickup optical system of the fifth embodiment, as shown in FIG. 9, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 11:
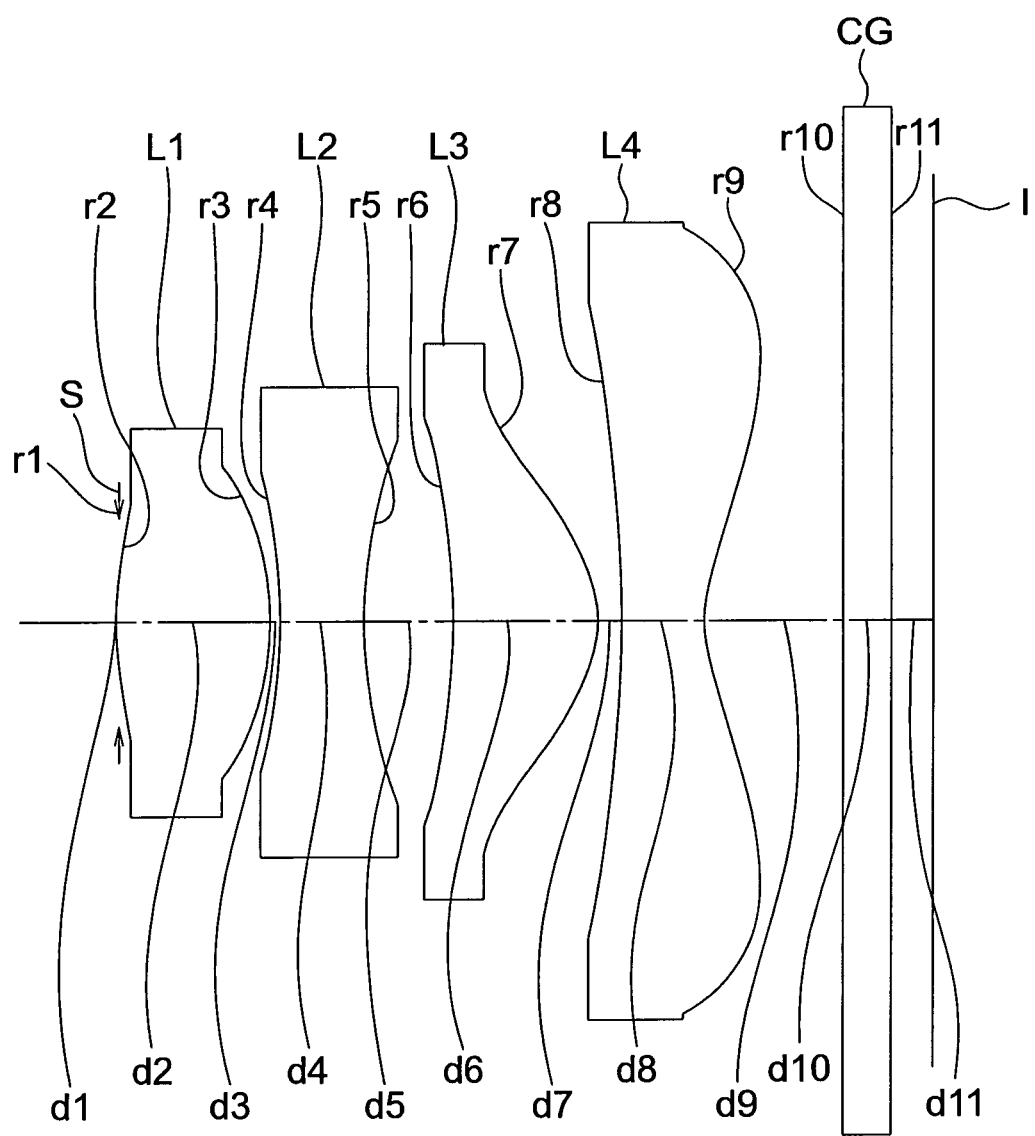
FIG. 11 is a cross-sectional view along an optical axis showing an optical arrangement at the time of infinite object point focusing of an image pickup optical system according to a sixth embodiment of the present invention.

Next, an image pickup optical system according to a sixth embodiment of the present invention will be described below. FIG. 11 is a cross-sectional view along an optical axis showing an optical arrangement at the time of infinite object point focusing of the image pickup optical system according to the sixth embodiment.

Figure 12:
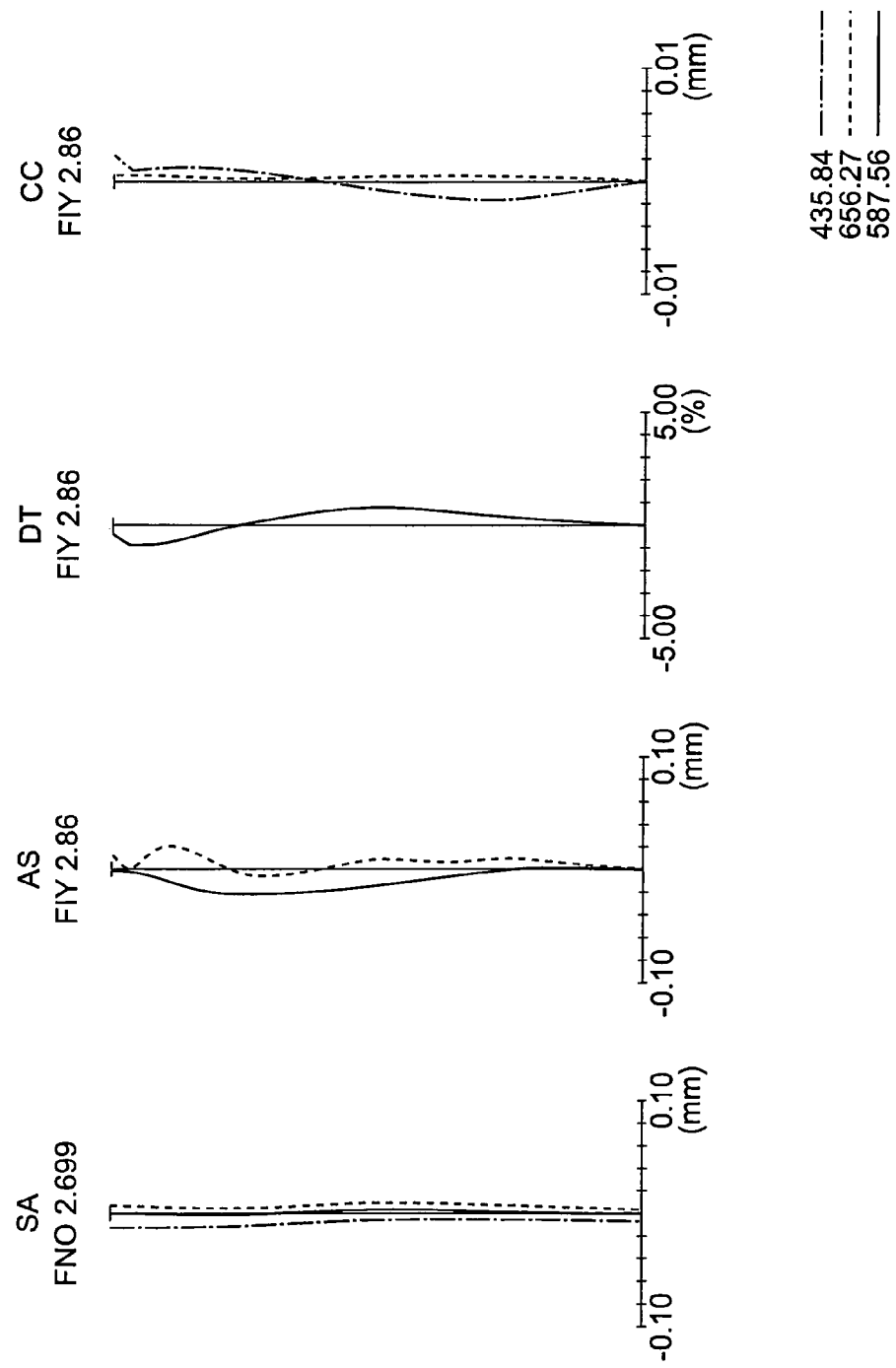
FIG. 12 is a diagram showing a spherical aberration (SA), an astigmatism (AS), a distortion (DT), and a chromatic aberration of magnification (CC) at the time of infinite object point focusing of the image pickup optical system according to the sixth embodiment.

FIG. 12 is a diagram showing a spherical aberration (SA), an astigmatism (AS), a distortion (DT), and a chromatic aberration of magnification (CC) at the time of infinite object point focusing of the image pickup optical system according to the sixth embodiment.

The image pickup optical system of the sixth embodiment, as shown in FIG. 11, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 13:
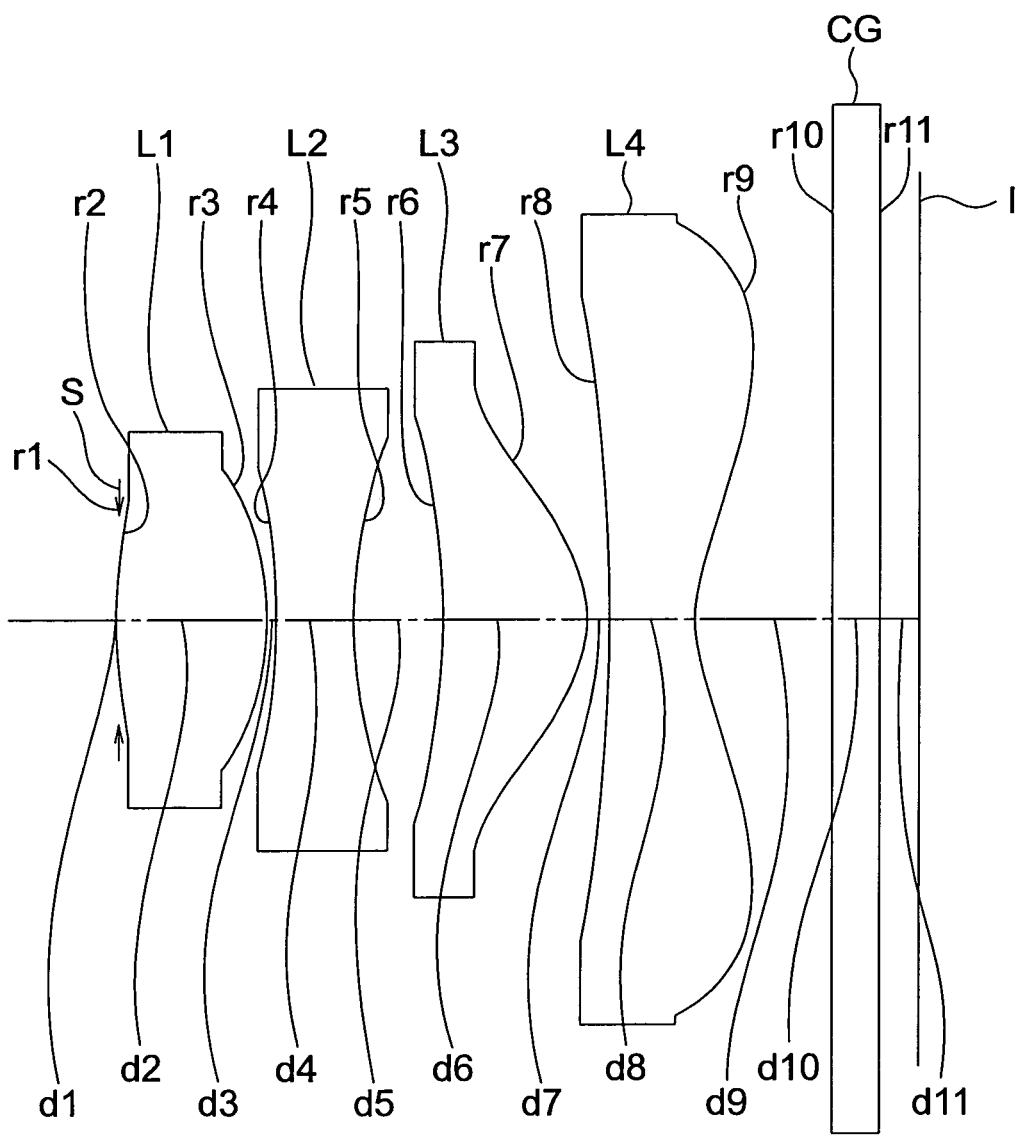
FIG. 13 is a cross-sectional view along an optical axis showing an optical arrangement at the time of infinite object point focusing of an image pickup optical system according to a seventh embodiment of the present invention.

Next, an image pickup optical system according to a seventh embodiment of the present invention will be described below. FIG. 13 is a cross-sectional view along an optical axis showing an optical arrangement at the time of infinite object point focusing of the image pickup optical system according to the seventh embodiment.

Figure 14:
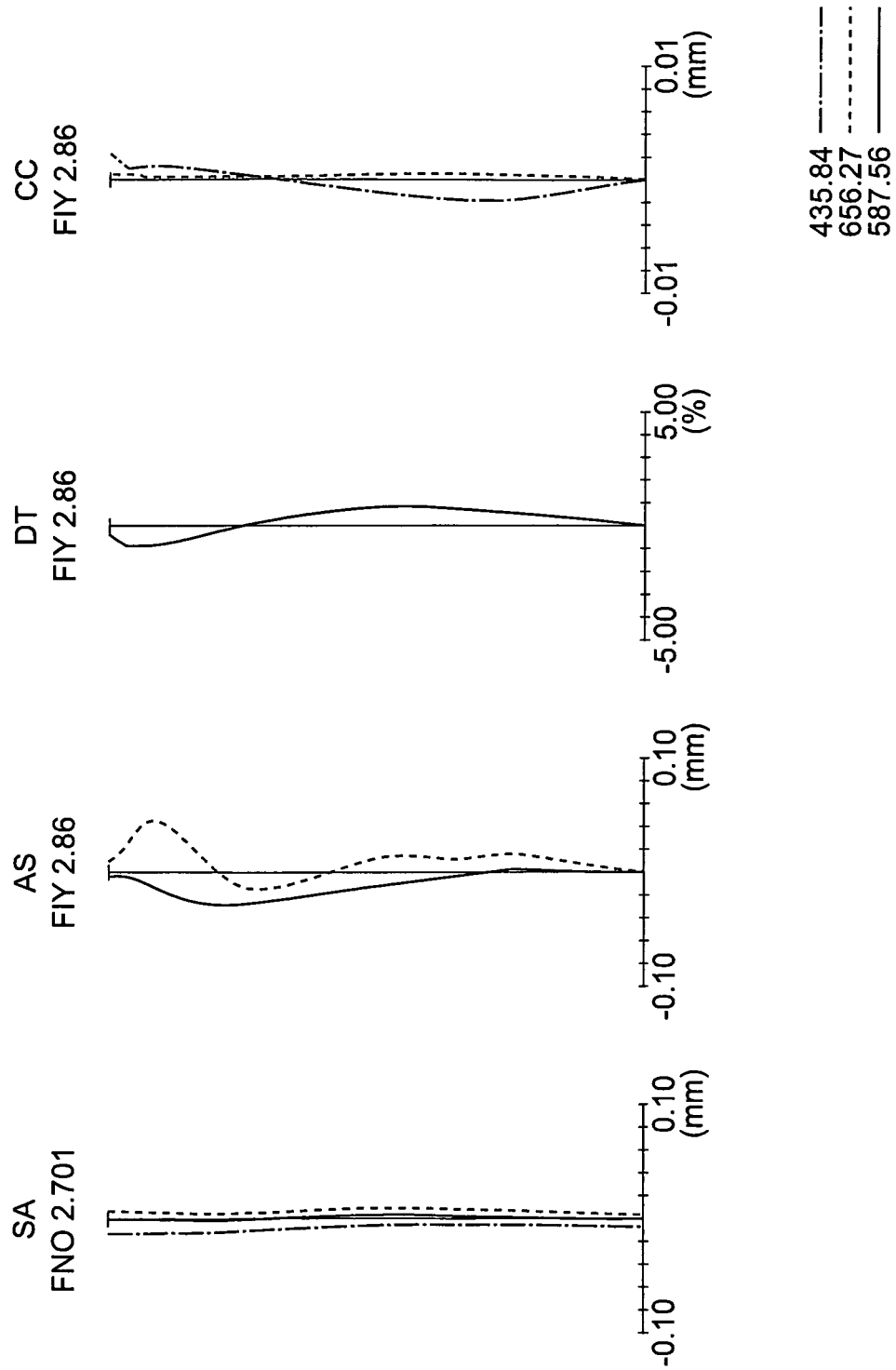
FIG. 14 is a diagram showing a spherical aberration (SA), an astigmatism (AS), a distortion (DT), and a chromatic aberration of magnification (CC) at the time of infinite object point focusing of the image pickup optical system according to the seventh embodiment.

FIG. 14 is a diagram showing a spherical aberration (SA), an astigmatism (AS), a distortion (DT), and a chromatic aberration of magnification (CC) at the time of infinite object point focusing of the image pickup optical system according to the seventh embodiment.

The image pickup optical system of the seventh embodiment, as shown in FIG. 13, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 15:
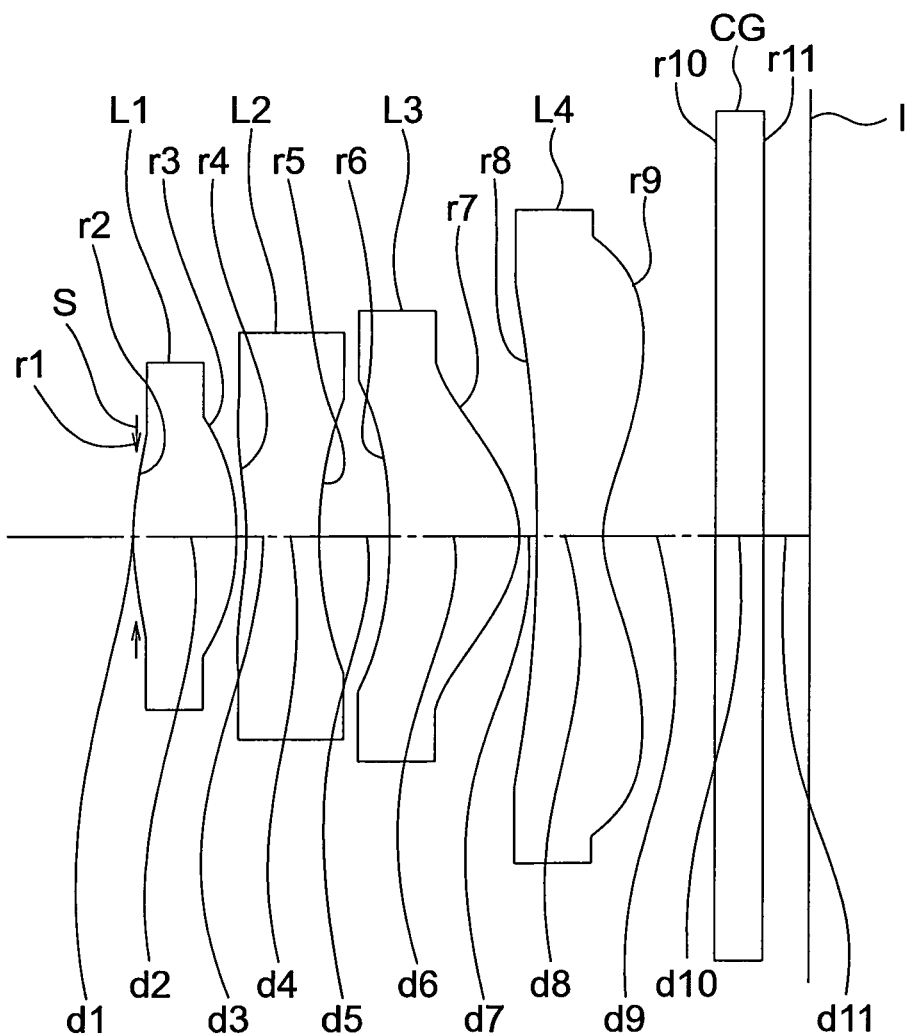
FIG. 15 is a cross-sectional view along an optical axis showing an optical arrangement at the time of infinite object point focusing of an image pickup optical system according to an eighth embodiment of the present invention.

Next, an image pickup optical system according to an eighth embodiment of the present invention will be described below. FIG. 15 is a cross-sectional view along an optical axis showing an optical arrangement at the time of infinite object point focusing of the image pickup optical system according to the eighth embodiment.

Figure 16:
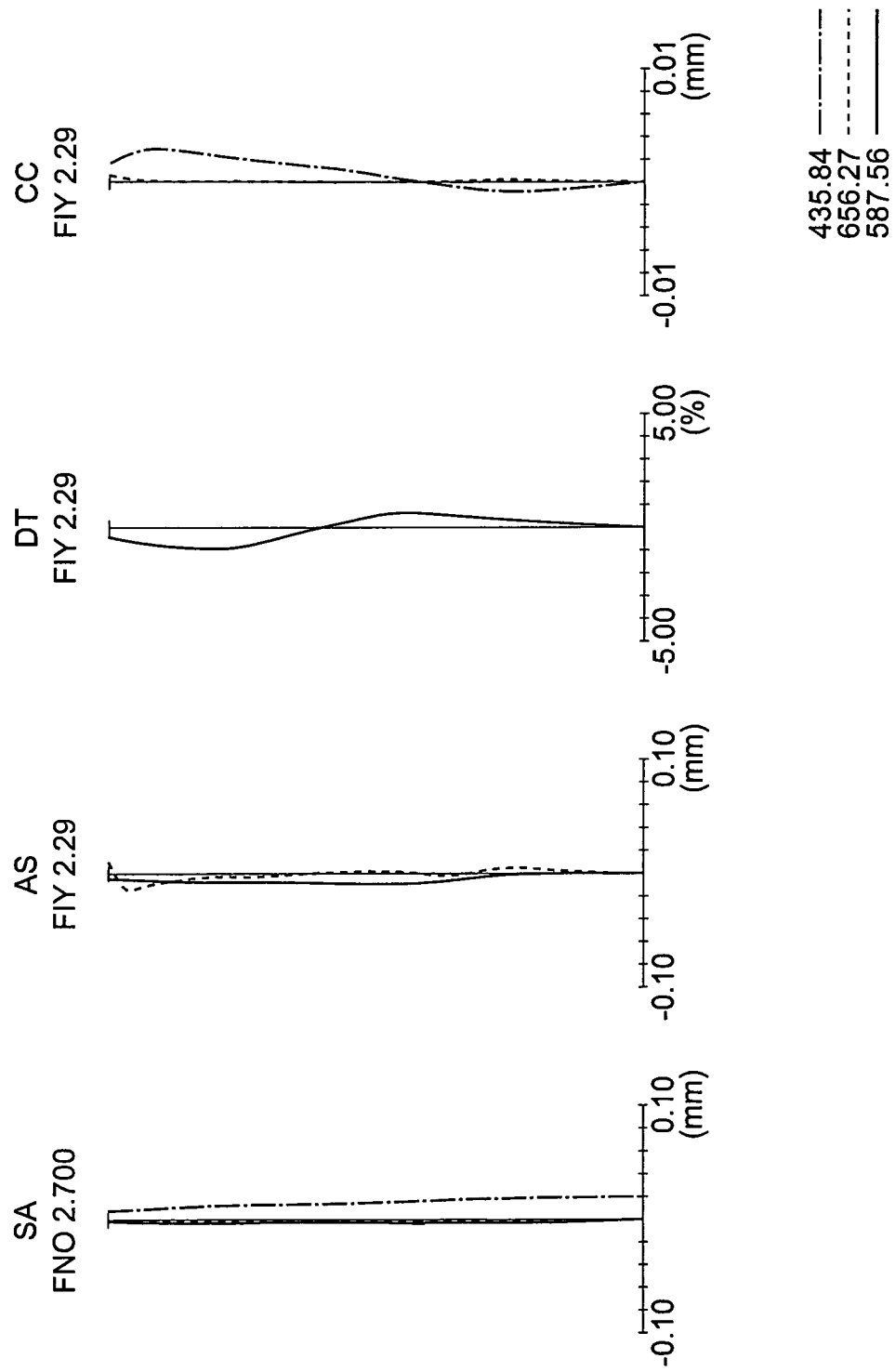
FIG. 16 is a diagram showing a spherical aberration (SA), an astigmatism (AS), a distortion (DT), and a chromatic aberration of magnification (CC) at the time of infinite object point focusing of the image pickup optical system according to the eighth embodiment.

FIG. 16 is a diagram showing a spherical aberration (SA), an astigmatism (AS), a distortion (DT), and a chromatic aberration of magnification (CC) at the time of infinite object point focusing of the image pickup optical system according to the eighth embodiment.

The image pickup optical system of the eighth embodiment, as shown in FIG. 15, includes in order from an object side, an aperture stop S, a first lens L1 having a positive refractive power, a second lens L2 having a negative refractive power, third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to seven surfaces namely, both surfaces of each of the first lens L1, the second lens L2, and the third lens L3, and a surface on an image side of the fourth lens L4.

Figure 17:
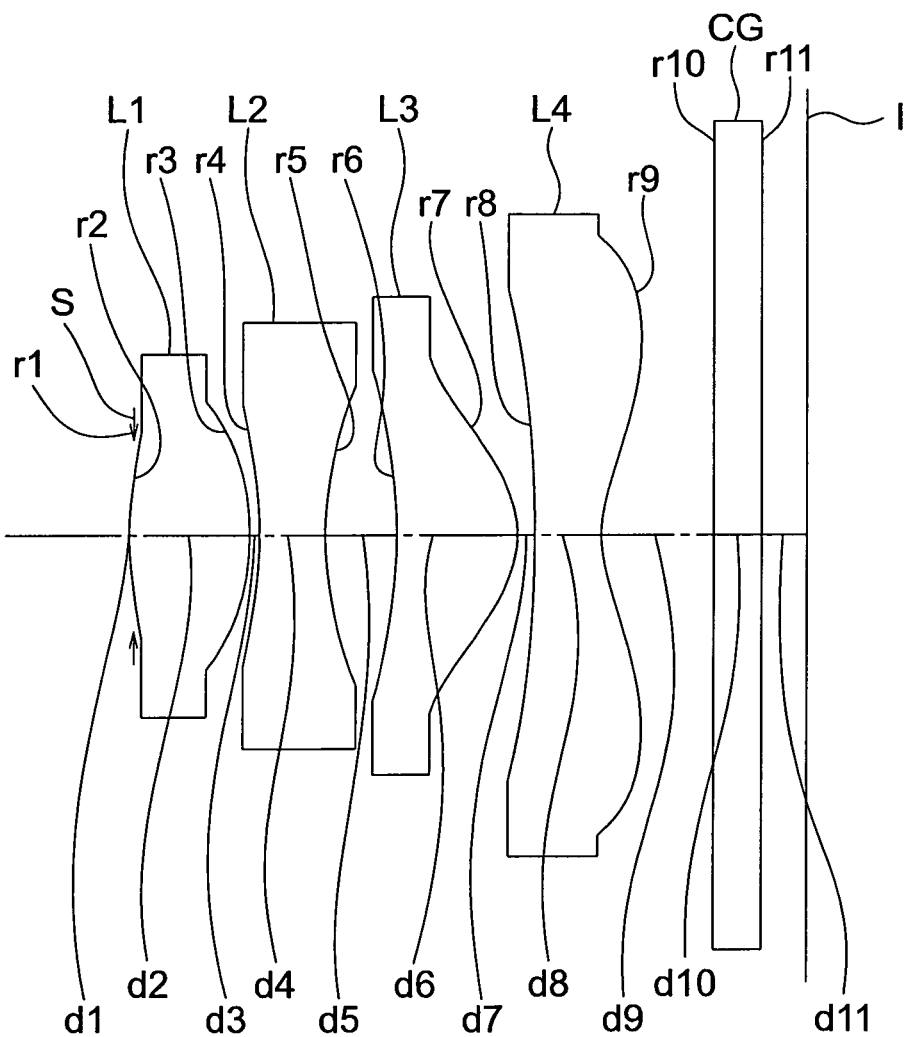
FIG. 17 is a cross-sectional view along an optical axis showing an optical arrangement at the time of infinite object point focusing of an image pickup optical system according to a ninth embodiment of the present invention.

Next, an image pickup optical system according to a ninth embodiment of the present invention will be described below. FIG. 17 is a cross-sectional view along an optical axis showing an optical arrangement at the time of infinite object point focusing of the image pickup optical system according to the ninth embodiment.

Figure 18:
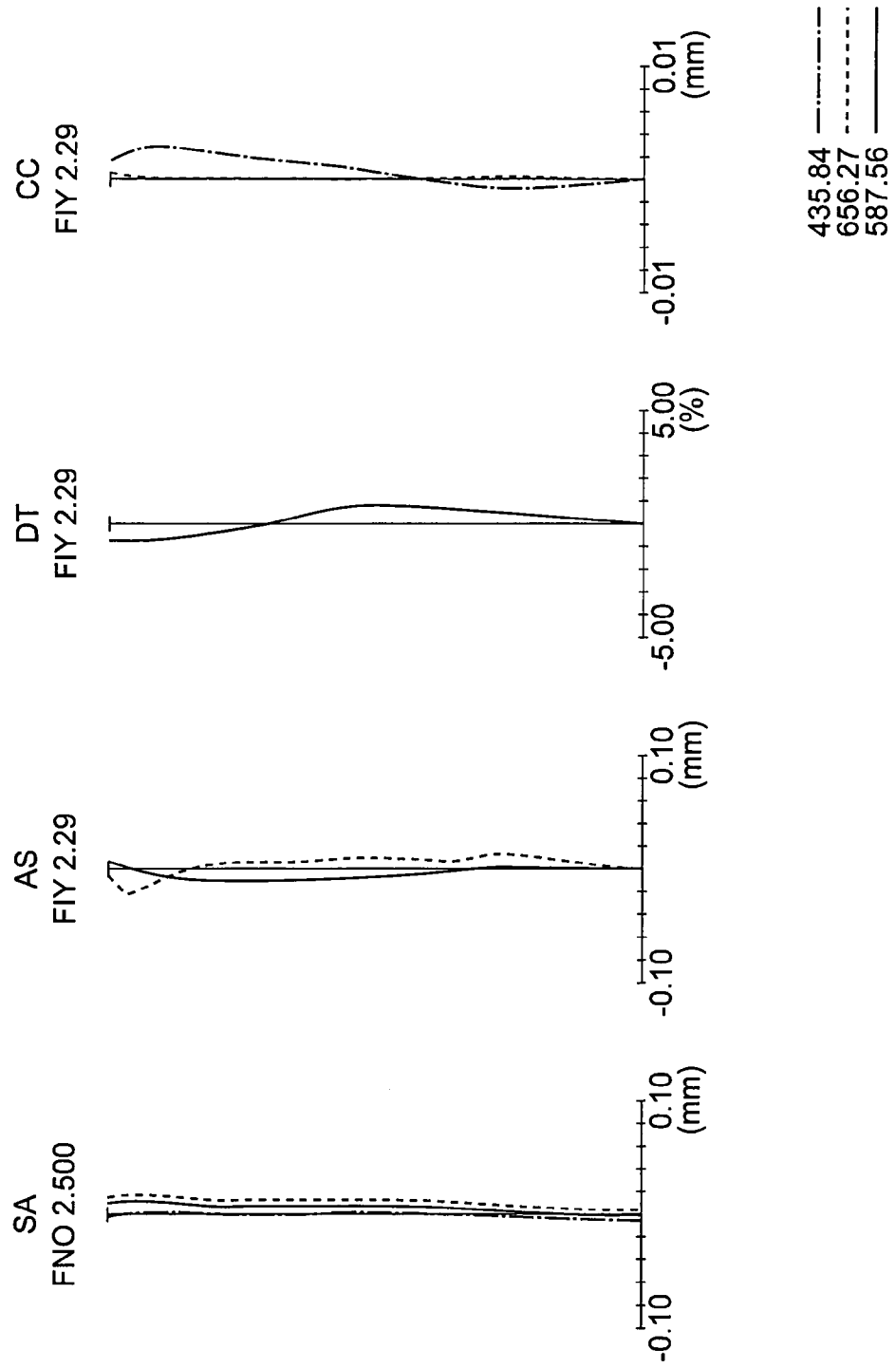
FIG. 18 is a diagram showing a spherical aberration (SA), an astigmatism (AS), a distortion (DT), and a chromatic aberration of magnification (CC) at the time of infinite object point focusing of the image pickup optical system according to the ninth embodiment.

FIG. 18 is a diagram showing a spherical aberration (SA), an astigmatism (AS), a distortion (DT), and a chromatic aberration of magnification (CC) at the time of infinite object point focusing of the image pickup optical system according to the ninth embodiment.

The image pickup optical system of the ninth embodiment, as shown in FIG. 17, includes in order from an object side, an aperture stop S, a first lens L1 having a positive refractive power, a second lens L2 having a negative refractive power, a third lens L3 having a positive refractive power, and a fourth lens L4 having a negative refractive power.

The first lens L1 is a biconvex positive lens. The second lens L2 is a biconcave negative lens. The third lens L3 is a positive meniscus lens having a concave surface directed toward the object side. The fourth lens L4 is a biconcave negative lens.

An aspheric surface is provided to eight surfaces namely, both surfaces of each of the first lens L1, the second lens L2, the third lens L3, and the fourth lens L4.

Numerical data of each embodiment described above is shown below. Apart from symbols described above, each of r1, r2, . . . denotes radius of curvature of each lens surface, each of d1, d2, . . . denotes a distance between two lenses, each of nd1, nd2, . . . denotes a refractive index of each lens for a d-line, each of vd1, vd2, denotes an Abbe constant for each lens, $F_{NO}$ denotes an F number, f denotes a focal length of the entire zoom lens system, ω denotes a half angle of field, and further, * denotes an aspheric data, S denotes an aperture stop.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

These symbols are used in common in the following examples.

EXAMPLE 1

| Unit mm | | | | |
|---|---|---|---|---|
| Surface data | | | | |
| Surface no. | r | d | nd | vd |
| Object plane | ∞ | ∞ | | |
| 1(S) | ∞ | −0.03 | | |
| 2* | 2.235 | 0.80 | 1.53368 | 55.90 |
| 3* | −1.459 | 0.05 | | |
| 4* | −3.364 | 0.40 | 1.58366 | 30.31 |
| 5* | 2.059 | 0.45 | | |
| 6* | −3.775 | 0.74 | 1.53368 | 55.90 |
| 7* | −0.622 | 0.11 | | |
| 8 | −7.340 | 0.40 | 1.53368 | 55.90 |
| 9* | 0.798 | 0.68 | | |

-continued

Unit mm

| | | | | |
|---|---|---|---|---|
| 10 | ∞ | 0.30 | 1.51633 | 64.14 |
| 11 | ∞ | 0.28 | | |
| Image plane(Light receiving surface) ∞ 0. | | | | |

Aspherical surface data

2nd surface

K = 1.770
A4 = −7.72783e−02, A6 = −3.40091e−02, A8 = −2.24696e−01,
A10 = 1.05804e−01, A12 = −2.34225e−02
3rd surface K = −11.405
A4 = −3.61371e−01, A6 = 3.50779e−01, A8 = −2.23847e−01,
A10 = −2.79617e−02, A12 = −1.79443e−02
4th surface K = −61.495
A4 = −2.53722e−01, A6 = 1.57749e−01, A8 = 2.04292e−01,
A10 = −1.70411e−01, A12 = 4.74592e−03
5th surface K = −11.082
A4 = 5.92593e−02, A6 = −7.04438e−02, A8 = 4.27171e−0,
A10 = 2.71522e−02, A12 = −1.99514e−02
6th surface K = −3.776
A4 = −1.32189e−01, A6 = 3.49062e−01, A8 = −2.80220e−01,
A10 = 7.07615e−02, A12 = 3.45995e−03, A14 = 2.84433e−03,
A16 = −6.71436e−03
7th surface K = −3.363
A4 = −2.96456e−01, A6 = 3.31692e−01, A8 = −1.08811e−01,
A10 = 1.25186e−02, A12 = 3.50852e−04, A14 = −7.12411e−05,
A16 = 1.32893e−04
9th surface K = −7.403
A4 = −8.01002e−02, A6 = 2.17325e−02, A8 = −4.96820e−03,
A10 = 4.13531e−04, A12 = −5.04269e−06, A14 = −2.26260e−07,
A16 = −9.99010e−07

Various data

| | |
|---|---|
| Focal length | 3.00 |
| Fno. | 2.5 |
| Image angle ω | 37.39 |
| Image height | 2.291 |
| BF (in air) | 1.13 |
| Total lens length (in air) | 4.08 |

EXAMPLE 2

Unit mm

Surface data

| Surface no. | r | d | nd | vd |
|---|---|---|---|---|
| Object plane | ∞ | ∞ | | |
| 1(S) | ∞ | −0.03 | | |
| 2* | 2.235 | 0.78 | 1.53368 | 55.90 |
| 3* | −1.459 | 0.05 | | |
| 4* | −3.359 | 0.39 | 1.58366 | 30.31 |
| 5* | 2.059 | 0.44 | | |
| 6* | −3.759 | 0.73 | 1.53368 | 55.90 |
| 7* | −0.621 | 0.11 | | |

-continued

Unit mm

| | | | | |
|---|---|---|---|---|
| 8 | −7.312 | 0.40 | 1.53368 | 55.90 |
| 9* | 0.798 | 0.68 | | |
| 10 | ∞ | 0.30 | 1.51633 | 64.14 |
| 11 | ∞ | 0.28 | | |
| Image plane(Light receiving surface) ∞ 0. | | | | |

Aspherical surface data

2nd surface

K = 1.570
A4 = −8.07021e−02, A6 = −3.78734e−02, A8 = −2.29717e−01,
A10 = 1.00622e−01, A12 = −2.48014e−02
3rd surface K = −11.180
A4 = −3.61943e−01, A6 = 3.52348e−01, A8 = −2.20672e−01,
A10 = −2.72644e−02, A12 = −3.43088e−02
4th surface K = −64.296
A4 = −2.52382e−01, A6 = 1.58717e−01, A8 = 2.07503e−01,
A10 = −1.53876e−01, A12 = 2.78690e−02
5th surface K = −11.706
A4 = 5.64289e−02, A6 = −7.37461e−02, A8 = 3.87010e−02,
A10 = 2.38988e−02, A12 = −1.21438e−02
6th surface K = −3.551
A4 = −1.33343e−01, A6 = 3.45618e−01, A8 = −2.82505e−01,
A10 = 6.91217e−02, A12 = 2.13277e−03, A14 = 1.67222e−03,
A16 = −7.80080e−03
7th surface K = −3.323
A4 = −2.96325e−01, A6 = 3.33203e−01, A8 = −1.07909e−01,
A10 = 1.30004e−02, A12 = 6.14409e−04, A14 = 7.86108e−05,
A16 = 2.21878e−04
9th surface K = −7.525
A4 = −7.96931e−02, A6 = 2.18417e−02, A8 = −4.97927e−03,
A10 = 4.07108e−04, A12 = −5.81818e−06, A14 = −7.35653e−07,
A16 = −1.24411e−06

Various data

| | |
|---|---|
| Focal length | 3.00 |
| Fno. | 2.5 |
| Image angle ω | 37.56 |
| Image height | 2.291 |
| BF (in air) | 1.15 |
| Total lens length (in air) | 4.06 |

EXAMPLE 3

Unit mm

Surface data

| Surface no. | r | d | nd | vd |
|---|---|---|---|---|
| Object plane | ∞ | ∞ | | |
| 1(S) | ∞ | −0.03 | | |
| 2* | 2.229 | 0.76 | 1.53368 | 55.90 |
| 3* | −1.462 | 0.05 | | |
| 4* | −3.353 | 0.40 | 1.58366 | 30.31 |
| 5* | 2.059 | 0.44 | | |
| 6* | −3.763 | 0.72 | 1.53368 | 55.90 |
| 7* | −0.621 | 0.11 | | |
| 8 | −7.308 | 0.40 | 1.53368 | 55.90 |

-continued

| Unit mm | | | | |
|---|---|---|---|---|
| 9* | 0.798 | 0.68 | | |
| 10 | ∞ | 0.30 | 1.51633 | 64.14 |
| 11 | ∞ | 0.29 | | |
| Image plane(Light receiving surface) | ∞ | 0. | | |

Aspherical surface data

2nd surface

K = 1.514
A4 = −8.12697e−02, A6 = −4.16126e−02, A8 = −2.31151e−01,
A10 = 1.00280e−01, A12 = −3.39736e−02
3rd surface K = −10.904
A4 = −3.59641e−01, A6 = 3.53525e−01, A8 = −2.22629e−01,
A10 = −2.40573e−02, A12 = 2.20672e−02
4th surface K = −61.131
A4 = −2.58470e−01, A6 = 1.56163e−01, A8 = 2.42073e−01,
A10 = −6.60670e−02, A12 = −6.01968e−02
5th surface K = −12.191
A4 = 5.49200e−02, A6 = −7.45112e−02, A8 = 4.08911e−02,
A10 = 3.32303e−02, A12 = −6.79141e−03
6th surface K = −3.130
A4 = −1.33869e−01, A6 = 3.47279e−01, A8 = −2.78762e−01,
A10 = 7.26884e−02, A12 = 4.90912e−03, A14 = 3.78657e−03,
A16 = −6.27607e−03
7th surface K = −3.225
A4 = −2.91463e−01, A6 = 3.37034e−01, A8 = −1.06180e−01,
A10 = 1.36846e−02, A12 = 9.02189e−04, A14 = 2.25666e−04,
A16 = 3.13157e−04
9th surface K = −7.007
A4 = −8.10539e−02, A6 = 2.18068e−02, A8 = −4.95410e−03,
A10 = 4.16042e−04, A12 = −4.69055e−06, A14 = −9.02657e−07,
A16 = −1.44250e−06

Various data

| | |
|---|---|
| Focal length | 3.00 |
| Fno. | 2.4 |
| Image angle ω | 37.59 |
| Image height | 2.291 |
| BF (in air) | 1.16 |
| Total lens length (in air) | 4.04 |

EXAMPLE 4

| Unit mm | | | | |
|---|---|---|---|---|
| Surface data | | | | |
| Surface no. | r | d | nd | vd |
| Object plane | ∞ | ∞ | | |
| 1(S) | ∞ | −0.04 | | |
| 2* | 2.229 | 0.76 | 1.53368 | 55.90 |
| 3* | −1.462 | 0.05 | | |
| 4* | −3.353 | 0.40 | 1.58366 | 30.31 |
| 5* | 2.059 | 0.44 | | |
| 6* | −3.764 | 0.72 | 1.53368 | 55.90 |
| 7* | −0.621 | 0.11 | | |
| 8 | −7.309 | 0.40 | 1.53368 | 55.90 |

-continued

| Unit mm | | | | |
|---|---|---|---|---|
| 9* | 0.798 | 0.68 | | |
| 10 | ∞ | 0.30 | 1.51633 | 64.14 |
| 11 | ∞ | 0.29 | | |
| Image plane(Light receiving surface) | ∞ | 0. | | |

Aspherical surface data

2nd surface

K = 1.518
A4 = −8.11644e−02, A6 = −4.15925e−02, A8 = −2.31418e−01,
A10 = 9.92807e−02, A12 = −3.66576e−02
3rd surface K = −10.897
A4 = −3.59669e−01, A6 = 3.53623e−01, A8 = −2.22157e−01,
A10 = −2.26589e−02, A12 = 2.56664e−02
4th surface K = −61.180
A4 = −2.58421e−01, A6 = 1.56164e−01, A8 = 2.41692e−01,
A10 = −6.76689e−02, A12 = −6.45754e−02
5th surface K = −12.189
A4 = 5.49000e−02, A6 = −7.45769e−02, A8 = 4.07218e−02,
A10 = 3.26149e−02, A12 = −8.90966e−03
6th surface K = −3.054
A4 = −1.34017e−01, A6 = 3.47204e−01, A8 = −2.78789e−01,
A10 = 7.26807e−02, A12 = 4.91260e−03, A14 = A4 = 3.80187e−03,
A16 = −6.24376e−03
7th surface K = −3.223
A4 = −2.91587e−01, A6 = 3.36957e−01, A8 = −1.06202e−01,
A10 = 1.37025e−02, A12 = 9.11053e−04, A14 = 2.29848e−04,
A16 = 3.14798e−04
9th surface K = −7.012
A4 = −8.12111e−02, A6 = 2.18012e−02, A8 = −4.95386e−03,
A10 = 4.17679e−04, A12 = −4.33456e−06, A14 = −8.24676e−07,
A16 = −1.42705e−06

Various data

| | |
|---|---|
| Focal length | 3.00 |
| Fno. | 2.3 |
| Image angle ω | 37.57 |
| Image height | 2.291 |
| BF (in air) | 1.16 |
| Total lens length (in air) | 4.04 |

EXAMPLE 5

| Unit mm | | | | |
|---|---|---|---|---|
| Surface data | | | | |
| Surface no. | r | d | nd | vd |
| Object plane | ∞ | ∞ | | |
| 1(S) | ∞ | −0.04 | | |
| 2* | 2.227 | 0.79 | 1.53368 | 55.90 |
| 3* | −1.464 | 0.05 | | |
| 4* | −3.350 | 0.39 | 1.58366 | 30.31 |
| 5* | 2.053 | 0.44 | | |
| 6* | −3.779 | 0.72 | 1.53368 | 55.90 |
| 7* | −0.622 | 0.11 | | |
| 8 | −7.507 | 0.40 | 1.53368 | 55.90 |

-continued

| Unit mm | | | | |
|---|---|---|---|---|
| 9* | 0.799 | 0.68 | | |
| 10 | ∞ | 0.30 | 1.51633 | 64.14 |
| 11 | ∞ | 0.29 | | |
| Image plane(Light receiving surface) | ∞ | 0. | | |

Aspherical surface data

2nd surface

K = 1.550
A4 = −8.06882e−02, A6 = −4.02224e−02, A8 = −2.30828e−01,
A10 = 9.62003e−02, A12 = −4.85076e−02
3rd surface K = −10.955
A4 = −3.60275e−01, A6 = 3.52684e−01, A8 = −2.21528e−01,
A10 = −1.82257e−02, A12 = 3.73561e−02
4th surface K = −59.899
A4 = −2.57936e−01, A6 = 1.58385e−01, A8 = 2.43965e−01,
A10 = −6.49317e−02, A12 = −6.77801e−02
5th surface K = −12.113
A4 = 5.50624e−02, A6 = −7.39045e−02, A8 = 4.29937e−02,
A10 = 3.64779e−02, A12 = −7.44165e−03
6th surface K = −3.322
A4 = −1.33400e−01, A6 = 3.47297e−01, A8 = −2.79014e−01,
A10 = 7.23383e−02, A12 = 4.71426e−03, A14 = 3.67525e−03,
A16 = −5.69845e−03
7th surface K = −3.229
A4 = −2.91677e−01, A6 = 3.37029e−01, A8 = −1.06206e−01,
A10 = 1.36341e−02, A12 = 8.08565e−04, A14 = 1.30084e−04,
A16 = 2.18372e−04
9th surface K = −7.060
A4 = −8.10147e−02, A6 = 2.17944e−02, A8 = −4.95708e−03,
A10 = 4.16311e−04, A12 = −4.94297e−06, A14 = −9.40880e−07,
A16 = −1.31054e−06

Various data

| | |
|---|---|
| Focal length | 3.00 |
| Fno. | 2.2 |
| Image angle ω | 37.57 |
| Image height | 2.291 |
| BF (in air) | 1.16 |
| Total lens length (in air) | 4.05 |

EXAMPLE 6

| Unit mm | | | | |
|---|---|---|---|---|
| Surface data | | | | |
| Surface no. | r | d | nd | vd |
| Object plane | ∞ | ∞ | | |
| 1(S) | ∞ | −0.02 | | |
| 2* | 2.752 | 0.95 | 1.53368 | 55.90 |
| 3* | −1.808 | 0.06 | | |
| 4* | −4.208 | 0.51 | 1.58366 | 30.31 |
| 5* | 2.559 | 0.55 | | |
| 6* | −5.127 | 0.89 | 1.53368 | 55.90 |
| 7* | −0.780 | 0.14 | | |
| 8 | −10.103 | 0.52 | 1.53368 | 55.90 |

-continued

| Unit mm | | | | |
|---|---|---|---|---|
| 9* | 0.979 | 0.85 | | |
| 10 | ∞ | 0.30 | 1.51633 | 64.14 |
| 11 | ∞ | 0.25 | | |
| Image plane(Light receiving surface) | ∞ | 0. | | |

Aspherical surface data

2nd surface

K = 1.505
A4 = −4.16755e−02, A6 = −1.42717e−02, A8 = −5.03376e−02,
A10 = 1.22474e−02, A12 = −6.52524e−04
3rd surface K = −11.096
A4 = −1.85216e−01, A6 = 1.16308e−01, A8 = −4.70315e−02,
A10 = −7.85153e−03, A12 = −8.65167e−03
4th surface K = −65.155
A4 = −1.29531e−01, A6 = 5.12818e−02, A8 = 4.44380e−02,
A10 = −1.66526e−02, A12 = −1.77233e−04
5th surface K = −11.722
A4 = 2.88106e−02, A6 = −2.41356e−02, A8 = 8.13664e−03,
A10 = 3.28100e−03, A12 = −8.76236e−04
6th surface K = −2.733
A4 = −6.89399e−02, A6 = 1.12794e−01, A8 = −5.92483e−02,
A10 = 9.29311e−03, A12 = 1.72055e−04, A14 = 7.04992e−05,
A16 = −2.95654e−04
7th surface K = −3.238
A4 = −1.51732e−01, A6 = 1.09416e−01, A8 = −2.25464e−02,
A10 = 1.76828e−03, A12 = 6.25721e−05, A14 = 9.00277e−06,
A16 = 1.01901e−05
9th surface K = −6.828
A4 = −3.78831e−02, A6 = 6.92859e−03, A8 = −1.10287e−03,
A10 = 5.32732e−05, A12 = −4.40645e−07, A14 = −1.51789e−08,
A16 = −3.81205e−08

Various data

| | |
|---|---|
| Focal length | 3.57 |
| Fno. | 2.7 |
| Image angle ω | 38.86 |
| Image height | 2.864 |
| BF (in air) | 1.29 |
| Total lens length (in air) | 4.91 |

EXAMPLE 7

| Unit mm | | | | |
|---|---|---|---|---|
| Surface data | | | | |
| Surface no. | r | d | nd | vd |
| Object plane | ∞ | ∞ | | |
| 1(S) | ∞ | −0.02 | | |
| 2* | 2.748 | 0.94 | 1.53368 | 55.90 |
| 3* | −1.801 | 0.06 | | |
| 4* | −4.223 | 0.47 | 1.58366 | 30.31 |
| 5* | 2.566 | 0.55 | | |
| 6* | −5.284 | 0.88 | 1.53368 | 55.90 |
| 7* | −0.780 | 0.14 | | |
| 8 | −11.683 | 0.52 | 1.53368 | 55.90 |

-continued

| Unit mm | | | | |
|---|---|---|---|---|
| 9* | 0.976 | 0.85 | | |
| 10 | ∞ | 0.30 | 1.51633 | 64.14 |
| 11 | ∞ | 0.22 | | |
| Image plane (Light receiving surface) | ∞ | 0. | | |

Aspherical surface data

2nd surface

K = 1.411
A4 = −4.23813e−02, A6 = −1.54046e−02, A8 = −5.17385e−02,
A10 = 1.07342e−02, A12 = −1.69464e−03
3rd surface K = −11.082
A4 = −1.85156e−01, A6 = 1.16518e−01, A8 = −4.75890e−02,
A10 = −1.04993e−02, A12 = −1.29558e−02
4th surface K = −65.496
A4 = −1.29589e−01, A6 = 5.10939e−02, A8 = 4.46104e−02,
A10 = −1.58142e−02, A12 = −1.84139e−03
5th surface K = −11.776
A4 = 2.88128e−02, A6 = −2.41009e−02, A8 = 8.18791e−03,
A10 = 3.36095e−03, A12 = −7.58271e−04
6th surface K = −4.201
A4 = −6.78039e−02, A6 = 1.13255e−01, A8 = −5.91013e−02,
A10 = 9.32900e−03, A12 = 1.79605e−04, A14 = 6.93827e−05,
A16 = −2.99544e−04
7th surface K = −3.219
A4 = −1.51867e−01, A6 = 1.09418e−01, A8 = −2.25447e−02,
A10 = 1.77017e−03, A12 = 6.33282e−05, A14 = 9.57371e−06,
A16 = 1.05533e−05
9th surface K = −6.612
A4 = −3.72283e−02, A6 = 7.03455e−03 A8 = −1.10556e−03,
A10 = 5.31473e−05, A12 = −3.50640e−07, A14 = −1.91372e−09,
A16 = −3.73361e−08

Various data

| | |
|---|---|
| Focal length | 3.46 |
| Fno. | 2.7 |
| Image angle ω | 39.77 |
| Image height | 2.864 |
| BF (in air) | 1.27 |
| Total lens length (in air) | 4.83 |

EXAMPLE 8

| Unit mm | | | | |
|---|---|---|---|---|
| Surface data | | | | |
| Surface no. | r | d | nd | vd |
| Object plane | ∞ | ∞ | | |
| 1(S) | ∞ | −0.02 | | |
| 2* | 2.229 | 0.64 | 1.53368 | 55.90 |
| 3* | −1.480 | 0.05 | | |
| 4* | −3.790 | 0.44 | 1.61421 | 25.60 |
| 5* | 2.165 | 0.44 | | |
| 6* | −3.256 | 0.81 | 1.53368 | 55.90 |
| 7* | −0.614 | 0.11 | | |
| 8 | −8.994 | 0.40 | 1.53368 | 55.90 |

-continued

| Unit mm | | | | |
|---|---|---|---|---|
| 9* | 0.772 | 0.68 | | |
| 10 | ∞ | 0.30 | 1.51633 | 64.14 |
| 11 | ∞ | 0.28 | | |
| Image plane (Light receiving surface) | ∞ | 0. | | |

Aspherical surface data

2nd surface

K = 0.752
A4 = −9.23846e−02, A6 = −6.51163e−02, A8 = −2.62825e−01,
A10 = 7.21874e−02, A12 = −8.47073e−03
3rd surface K = −11.875
A4 = −3.55736e−01, A6 = 3.54209e−01, A8 = −2.32499e−01,
A10 = −2.17661e−02, A12 = 1.34921e−01
4th surface K = −105.486
A4 = −2.26646e−01, A6 = 2.21163e−01, A8 = 3.13503e−01,
A10 = −7.90071e−02, A12 = −1.60029e−01
5th surface K = −15.234
A4 = 4.91755e−02, A6 = −7.37328e−02, A8 = 4.87899e−02,
A10 = 4.03077e−02, A12 = −2.45237e−02
6th surface K = 1.209
A4 = −1.47938e−01, A6 = 3.52452e−01, A8 = −2.82518e−01,
A10 = 6.19811e−02, A12 = −8.37973e−03, A14 = −1.01549e−02,
A16 = −2.01662e−02
7th surface K = −3.241
A4 = −2.88986e−01, A6 = 3.34359e−01, A8 = −1.07870e−01,
A10 = 1.32379e−02, A12 = 9.38235e−04, A14 = 3.51121e−04,
A16 = 4.15950e−04
9th surface K = −6.930
A4 = −8.46530e−02, A6 = 2.09949e−02, A8 = −4.85174e−03,
A10 = 4.52464e−04, A12 = −1.57481e−06, A14 = −1.59823e−06,
A16 = −1.86998e−06

Various data

| | |
|---|---|
| Focal length | 3.00 |
| Fno. | 2.7 |
| Image angle ω | 37.48 |
| Image height | 2.291 |
| BF (in air) | 1.16 |
| Total lens length (in air) | 4.05 |

EXAMPLE 9

| Unit mm | | | | |
|---|---|---|---|---|
| Surface data | | | | |
| Surface no. | r | d | nd | vd |
| Object plane | ∞ | ∞ | | |
| 1(S) | ∞ | −0.03 | | |
| 2* | 2.222 | 0.75 | 1.53368 | 55.90 |
| 3* | −1.464 | 0.05 | | |
| 4* | −3.359 | 0.41 | 1.58366 | 30.31 |
| 5* | 2.058 | 0.44 | | |
| 6* | −3.720 | 0.74 | 1.53368 | 55.90 |
| 7* | −0.620 | 0.11 | | |
| 8* | −7.332 | 0.40 | 1.53368 | 55.90 |

-continued

| Unit mm | | | | |
|---|---|---|---|---|
| 9* | 0.798 | 0.68 | | |
| 10 | ∞ | 0.30 | 1.51633 | 64.14 |
| 11 | ∞ | 0.28 | | |
| Image plane (Light receiving surface) | ∞ | 0. | | |

Aspherical surface data

2nd surface

K = 1.382
A4 = −8.39984e−02, A6 = −4.00715e−02, A8 = −2.32847e−01,
A10 = 9.21794e−02, A12 = −5.00696e−02
3rd surface K = −11.244
A4 = −3.61412e−01, A6 = 3.52396e−01, A8 = −2.22552e−01,
A10 = −3.05449e−02, A12 = −1.21648e−02
4th surface K = −63.354
A4 = −2.52595e−01, A6 = 1.62626e−01, A8 = 2.31615e−01,
A10 = −8.98057e−02, A12 = −4.32192e−02
5th surface K = −12.200
A4 = 5.49801e−02, A6 = −7.44690e−02, A8 = 3.91594e−02,
A10 = 2.66605e−02, A12 = −6.31817e−03
6th surface K = −2.432
A4 = −1.35459e−01, A6 = 3.45330e−01, A8 = −2.81284e−01,
A10 = 7.03665e−02, A12 = 2.92459e−03, A14 = 1.93672e−03,
A16 = −8.07542e−03
7th surface K = −3.251
A4 = −2.94075e−01, A6 = 3.35069e−01, A8 = −1.07050e−01,
A10 = 1.34157e−02, A12 = 8.54903e−04, A14 = 2.39373e−04,
A16 = 3.43445e−04
8th surface K = 0.887
A4 = −1.63656e−04, A6 = −1.09321e−05, A8 = −9.97062e−06,
A10 = −9.19578e−06
9th surface K = −7.157
A4 = −8.12820e−02, A6 = 2.17617e−02, A8 = −4.97833e−03,
A10 = 4.09491e−04, A12 = −6.11565e−06, A14 = −1.21975e−06,
A16 = −1.48942e−06

Various data

| Focal length | 2.99 |
|---|---|
| Fno. | 2.5 |
| Image angle ω | 37.63 |
| Image height | 2.291 |
| BF (in air) | 1.15 |
| Total lens length (in air) | 4.05 |

Further, values of each conditional expression are shown below:

| Conditional expression | Example 1 | Example 2 | Example 3 | Example 4 |
|---|---|---|---|---|
| ω | 37.39 | 37.56 | 37.59 | 37.57 |
| Fno | 2.5 | 2.5 | 2.4 | 2.3 |
| 1/v2 − 1/v1 | 0.02 | 0.02 | 0.02 | 0.02 |
| f4/f | −0.44 | −0.44 | −0.44 | −0.44 |
| (r8 + r9)/(r8 − r9) | 0.80 | 0.80 | 0.80 | 0.80 |
| (r2 + r3)/(r2 − r3) | 0.21 | 0.21 | 0.21 | 0.21 |
| (r4 + r5)/(r4 − r5) | 0.24 | 0.24 | 0.24 | 0.24 |
| (r6 + r7)/(r6 − r7) | 1.394 | 1.396 | 1.396 | 1.396 |
| αi | 23.61 | 23.67 | 24.21 | 24.39 |

| Conditional expression | Example 5 | Example 6 | Example 7 | Example 8 | Example 9 |
|---|---|---|---|---|---|
| ω | 37.57 | 38.86 | 39.77 | 37.48 | 37.63 |
| Fno | 2.2 | 2.7 | 2.7 | 2.7 | 2.5 |
| 1/v2 − 1/v1 | 0.02 | 0.02 | 0.02 | 0.02 | 0.015 |
| f4/f | −0.44 | −0.46 | −0.48 | −0.44 | −0.44 |
| (r8 + r9)/(r8 − r9) | 0.81 | 0.82 | 0.85 | 0.84 | 0.80 |
| (r2 + r3)/(r2 − r3) | 0.21 | 0.21 | 0.21 | 0.20 | 0.21 |
| (r4 + r5)/(r4 − r5) | 0.24 | 0.24 | 0.24 | 0.27 | 0.24 |
| (r6 + r7)/(r6 − r7) | 1.393 | 1.359 | 1.346 | 1.465 | 1.400 |
| αi | 24.26 | 19.23 | 18.20 | 21.60 | 23.10 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 19:
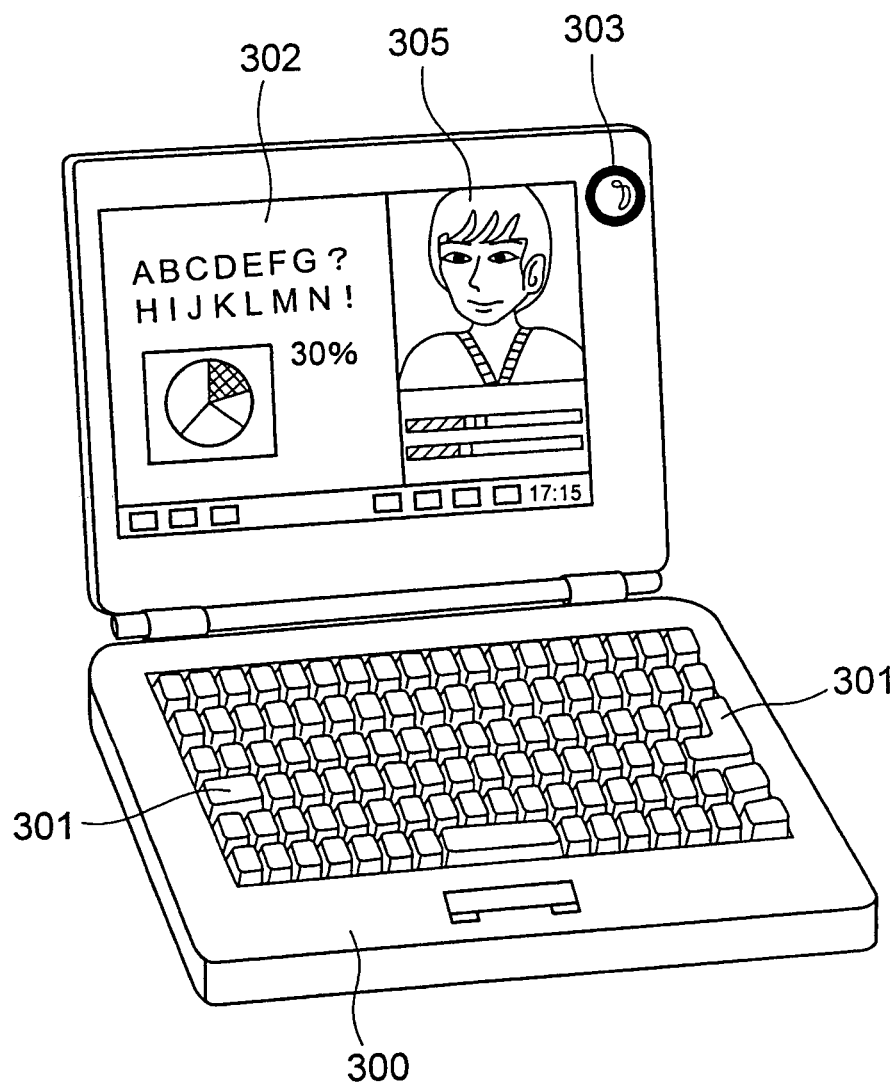
FIG. 19 is a front perspective view of a state in which, a cover of a personal computer 300 which is an example of an information processing apparatus in which, the image pickup optical system of the present invention has been built-in as an objective optical system, is opened.
Figure 20:
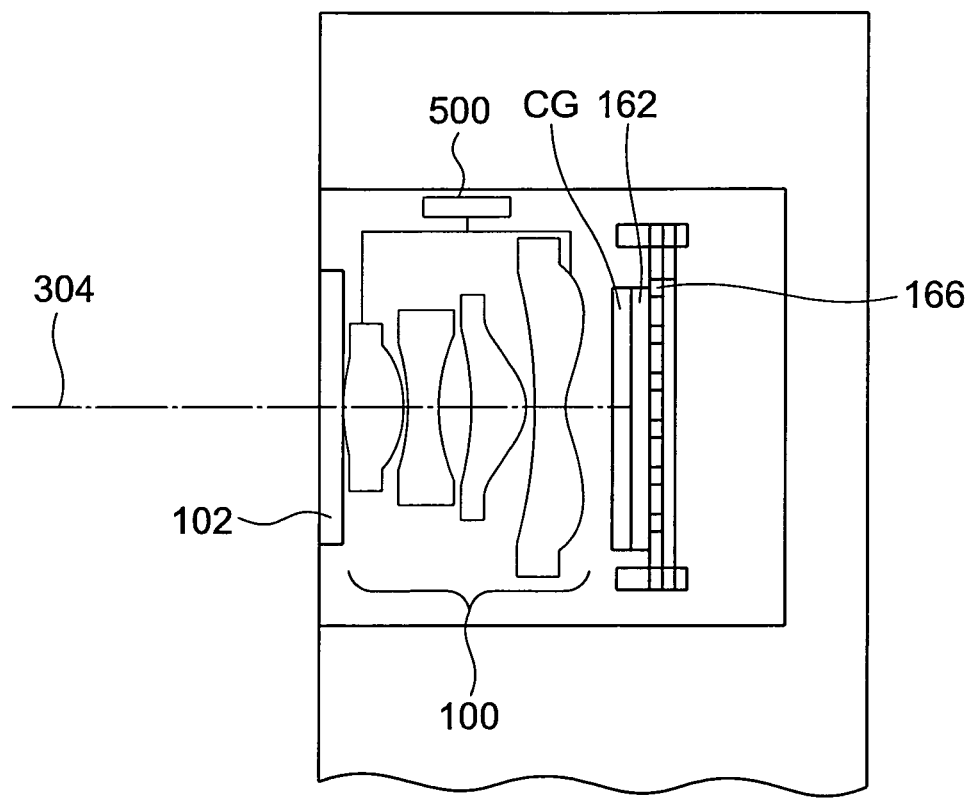
FIG. 20 is a cross-sectional view of a photographic optical system 303 of the personal computer 300.
Figure 21:
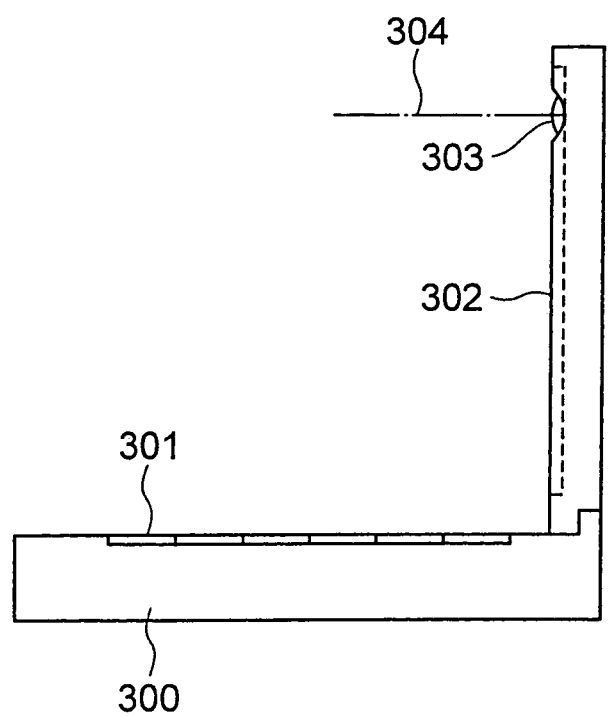
FIG. 21 is a side view of the personal computer 300.

Next, a personal computer which is an example of an information processing apparatus with a built-in image forming system as an objective optical system is shown in FIG. 19 to FIG. 21. FIG. 19 is a frontward perspective view of a personal computer 300 with its cover opened, FIG. 20 is a cross-sectional view of a photographic optical system 303 of the personal computer 300, and FIG. 21 is a side view of FIG. 19. As it is shown in FIG. 19 to FIG. 21, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

Although an image pickup optical system of a personal computer shown in the diagram has a lens cross-sectional arrangement which differs from the lens cross-sectional arrangement in each of the embodiments described above, the image pickup optical system same as in the embodiments described above is installed in the personal computer.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The image pickup apparatus 303 includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image by αi, it is possible to provide a personal computer (an image pickup apparatus) having a small size and an improved performance.

Figure 22A:
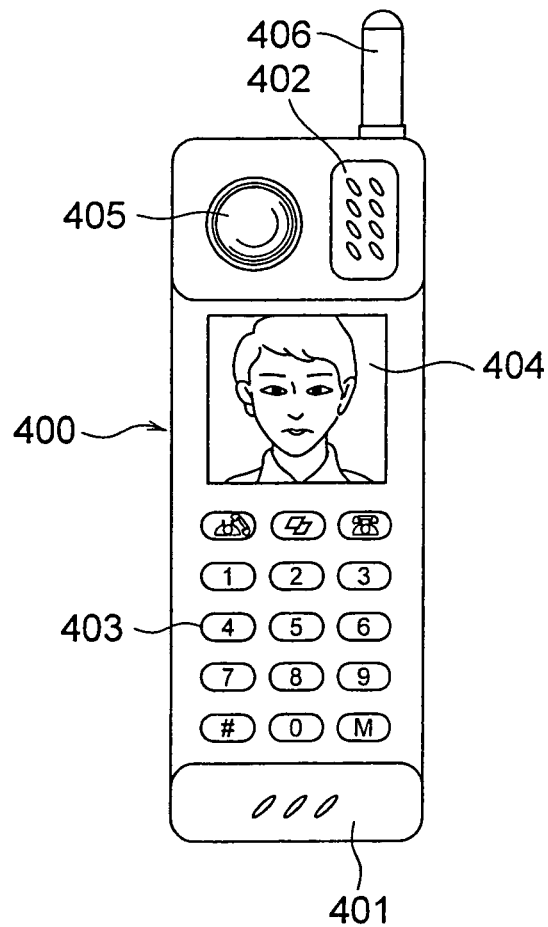
FIG. 22A is a front perspective view of a mobile telephone 400 which is an example of an information processing apparatus in which, the image pickup optical system of the present invention has been built-in as a photographic optical system.
Figure 22B:
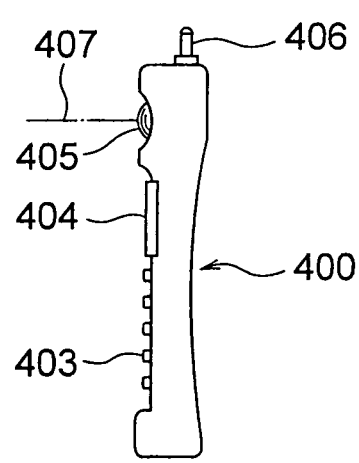
FIG. 22B is a side view of the mobile telephone 400.
Figure 22C:
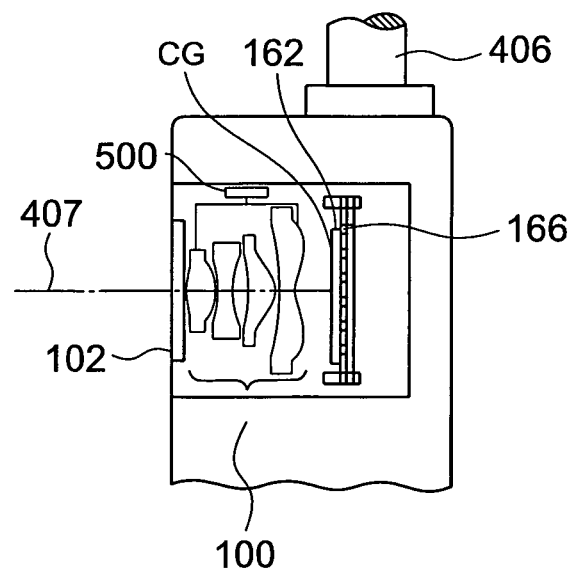
FIG. 22C is a cross-sectional view of a photographic optical system 405.

Next, a telephone which is an example of an information processing apparatus in which the image forming optical system of the present invention is built-in as a photographic optical system, particularly a portable telephone which is easy to carry is shown in FIG. 22A, FIG. 22B, and FIG. 22C. FIG. 22A is a front view of a portable telephone 400, FIG. 22B is a side view of the portable telephone 400, and FIG. 22C is a cross-sectional view of a photographic optical system 405. As shown in FIG. 22A to FIG. 22C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

Although an image pickup optical system of an information processing apparatus shown in the diagram has a lens cross-sectional arrangement which differs from the lens cross-sectional arrangement in each of the embodiments above, the image pickup optical system same as in the embodiments described above is installed in the information processing apparatus.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Moreover, the image pickup apparatus includes the auto-focus mechanism 500 which is integrated with the objective optical system 100 (image pickup optical system). By installing the auto-focus mechanism 500, it is possible to focus at any object distance.

Furthermore, it is desirable that the objective optical system 100 (image pickup optical system) and the electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change difference in a brightness of an image in a central portion and a peripheral portion of the image by αi, it is possible to provide a mobile telephone (an image pickup apparatus) having a small size and an improved The present invention can have various modifications which fairly fall within the basic teaching herein set forth.

As it has been described above, the present invention is useful for an image pickup optical system and an image pickup apparatus having a small size and an improved performance.

According to the present invention, there is shown an effect that it is possible to provide an image pickup optical system having a small size and a wide angle of field, and in which, various aberrations are corrected favorably, and an image pickup apparatus in which, such image pickup optical system is used.

What is claimed is:

1. An image pickup optical system having four lenses, comprising in order from an object side:
   a first lens having a biconvex shape, and a positive refractive power;
   a second lens having a biconcave shape, and a negative refractive power;
   a third lens having a meniscus shape with a concave surface thereof directed toward the object side, and a positive refractive power; and
   a fourth lens having a biconcave shape, and a negative refractive power, wherein
   a diaphragm is disposed nearest to the object side, and
   the image pickup optical system satisfies the following conditional expressions $$-0.9 < f4/f < 0 \tag{1}$$

$$-0.04 < (r8+r9)/(r8-r9) < 0.9 \tag{2}$$

$$-0.03 < (r4+r5)/(r4-r5) < 0.55 \tag{4}$$

where,
f4 denotes a focal length at a near-axis of the fourth lens,
f denotes a focal length of the overall image pickup optical system,
r8 denotes a radius of curvature of a surface on the object side of the fourth lens, and
r9 denotes a radius of curvature of a surface on an image side of the fourth lens,
r4 denotes a radius of curvature of a surface on the object side of the second lens,
r5 denotes a radius of curvature of a surface on the image side of the second lens, and
wherein
the surface on the object side of the fourth lens does not have a point of inflection.

2. The image pickup optical system according to claim 1, wherein the surface on the object side of the fourth lens is a spherical surface.

3. The image pickup optical system according to claim 1, wherein the image pickup optical system satisfies the following conditional expression $$0.08 < (r2+r3)/(r2-r3) < 0.42 \quad (3)$$

where,
r2 denotes a radius of curvature of a surface on the object side of the first lens, and
r3 denotes a radius of curvature of a surface on the image side of the first lens.

4. The image pickup optical system according to claim 1, wherein the image pickup optical system satisfies the following conditional expression $$1.10 < (r6+r7)/(r6-r7) < 1.52 \quad (5)$$

where,
r6 denotes a radius of curvature of a surface on the object side of the third lens, and
r7 denotes a radius of curvature of a surface on the image side of the third lens.

5. The image pickup optical system according to claim 1, wherein the first lens, the second lens, the third lens, and the fourth lens are formed of a resin.

6. An image pickup apparatus comprising:
an image pickup optical system according to claim 1; and
an electronic image pickup element having an image pickup surface, wherein
the image pickup apparatus satisfies the following conditional expression $$15° < \alpha i < 30° \quad (6)$$

where,
α denotes an angle of incidence of a principal light ray on the image pickup surface, at the maximum image height.

7. The image pickup apparatus according to claim 6, comprising:
an auto-focus mechanism which is integrated with the image pickup optical system.

8. The image pickup apparatus according to claim 6, wherein the image pickup optical system and the electronic image pickup element are integrated.

* * * * *